United States Patent [19]
Takase et al.

[11] Patent Number: 5,283,782
[45] Date of Patent: Feb. 1, 1994

[54] SYSTEM SWITCHING METHOD AND APPARATUS WITHOUT LOSS OF SIGNAL IN CELL SWITCHING SYSTEM OF ASYNCHRONOUS TRANSFER MODE

[75] Inventors: Akihiko Takase, Tokyo; Yoshihiro Ashi; Takashi Mori, both of Yokohama; Junichirou Yanagi, Kodaira, all of Japan

[73] Assignee: Hitachi, Ltd., Tokyo, Japan

[21] Appl. No.: 745,332

[22] Filed: Aug. 15, 1991

[30] Foreign Application Priority Data

Aug. 17, 1990 [JP] Japan ................................. 2-215709

[51] Int. Cl.⁵ .............................................. H04J 1/16
[52] U.S. Cl. ............................................ 370/16; 370/60
[58] Field of Search ............... 370/16, 94.1, 60, 13; 379/2, 221, 273; 371/7, 8.1, 9.1

[56] References Cited

U.S. PATENT DOCUMENTS 5,072,440 12/1991 Isono et al. ......................... 370/60
5,130,974 7/1992 Kawamura et al. ................ 370/16

Primary Examiner—Douglas W. Olms
Assistant Examiner—Shick Hom
Attorney, Agent, or Firm—Antonelli, Terry, Stout & Kraus

[57] ABSTRACT

In a communication apparatus using an asynchronous transfer mode, there is provided a system switching method, and apparatus, without loss of signal for performing cell multiplexing or cell switching in a duplex system including a primary system and a standby system. In system switching, control information for switching between the primary system and the standby system is prepared. When a cell is inputted to the communication apparatus, the prepared control information is appended in a header portion of the cell. The cell with control information appended thereto is transmitted to the duplex system including the primary system and the standby system. On the basis of the control information, cell transfer of each system is controlled.

14 Claims, 33 Drawing Sheets

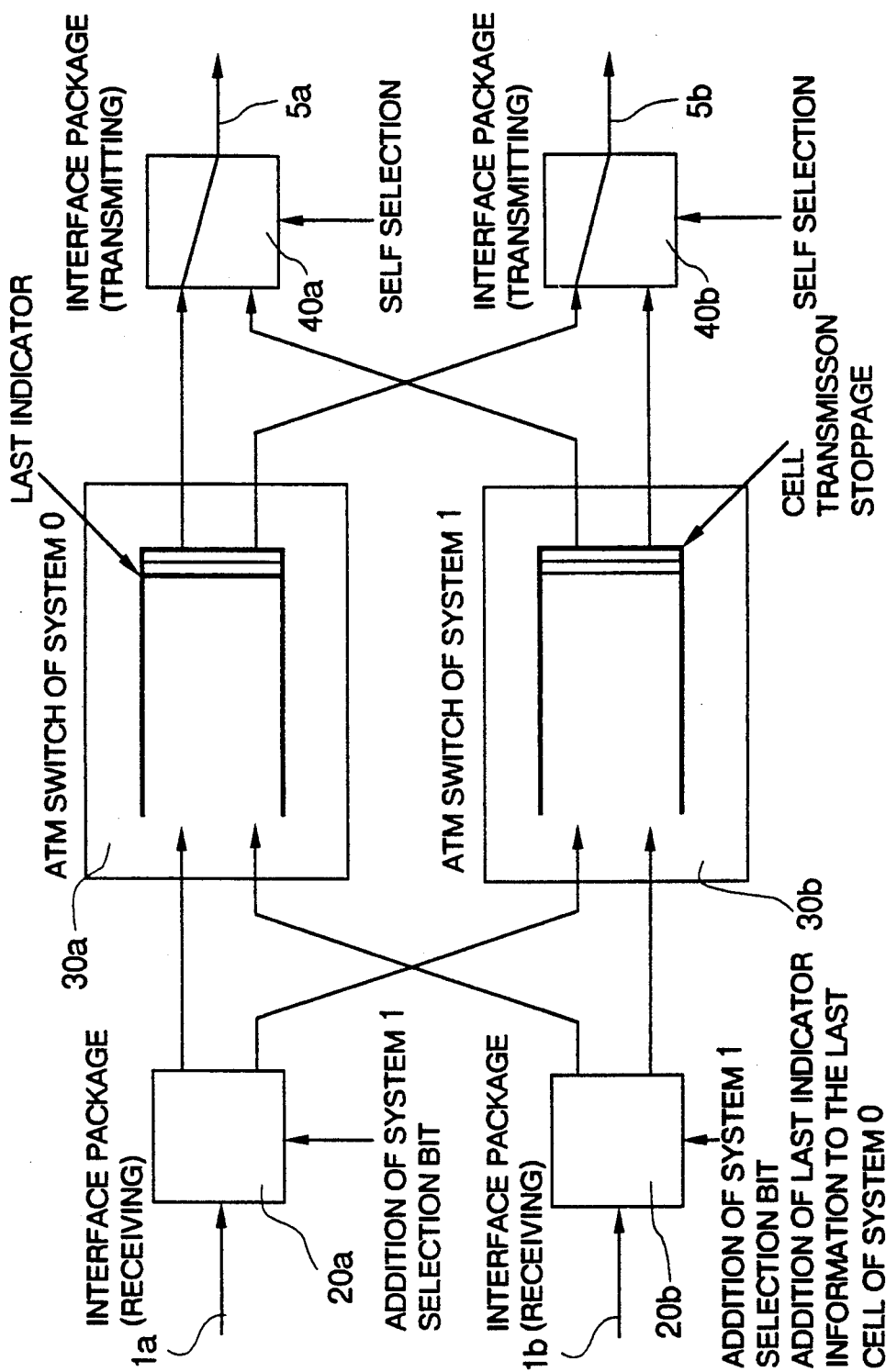
F I G. 7

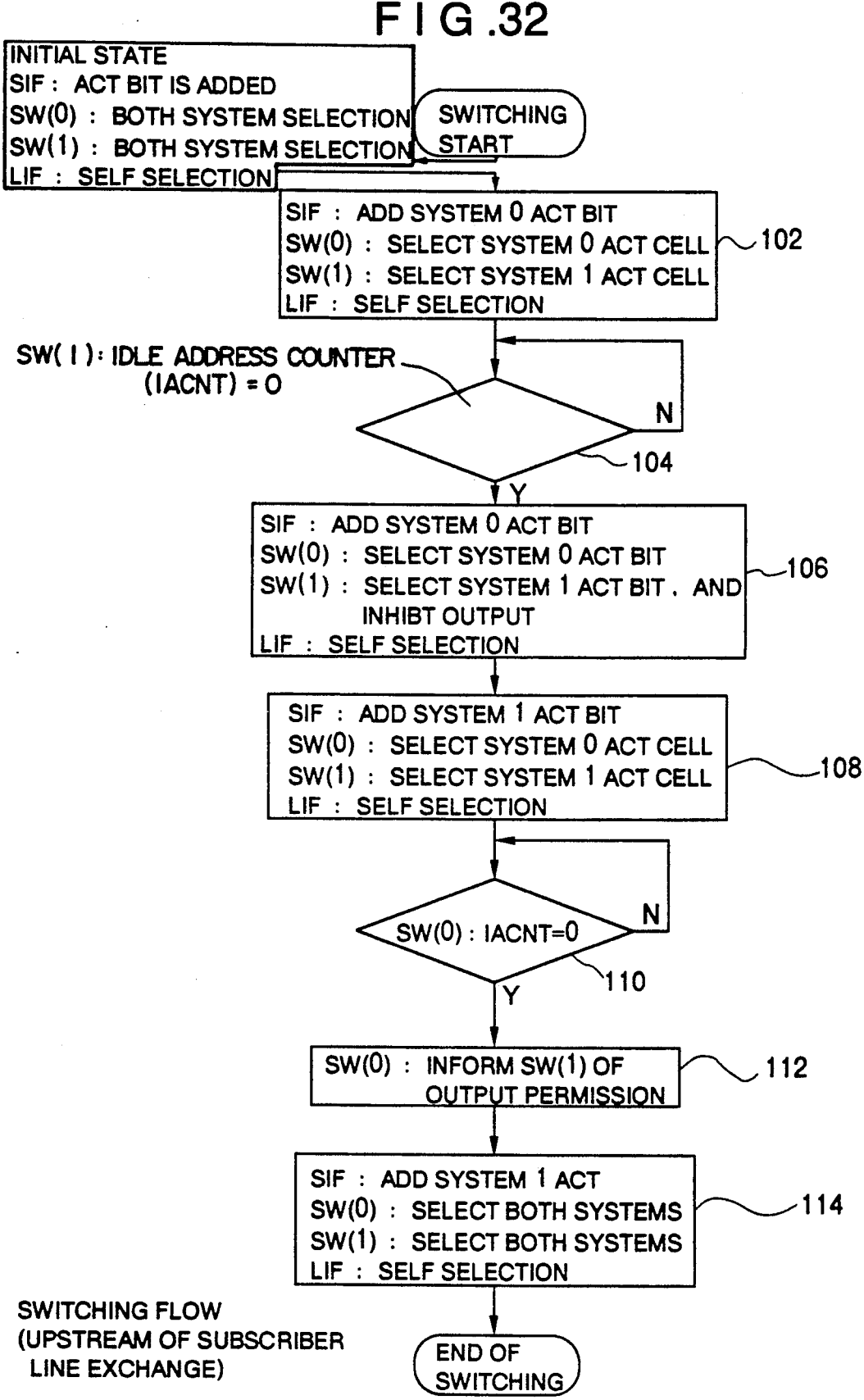

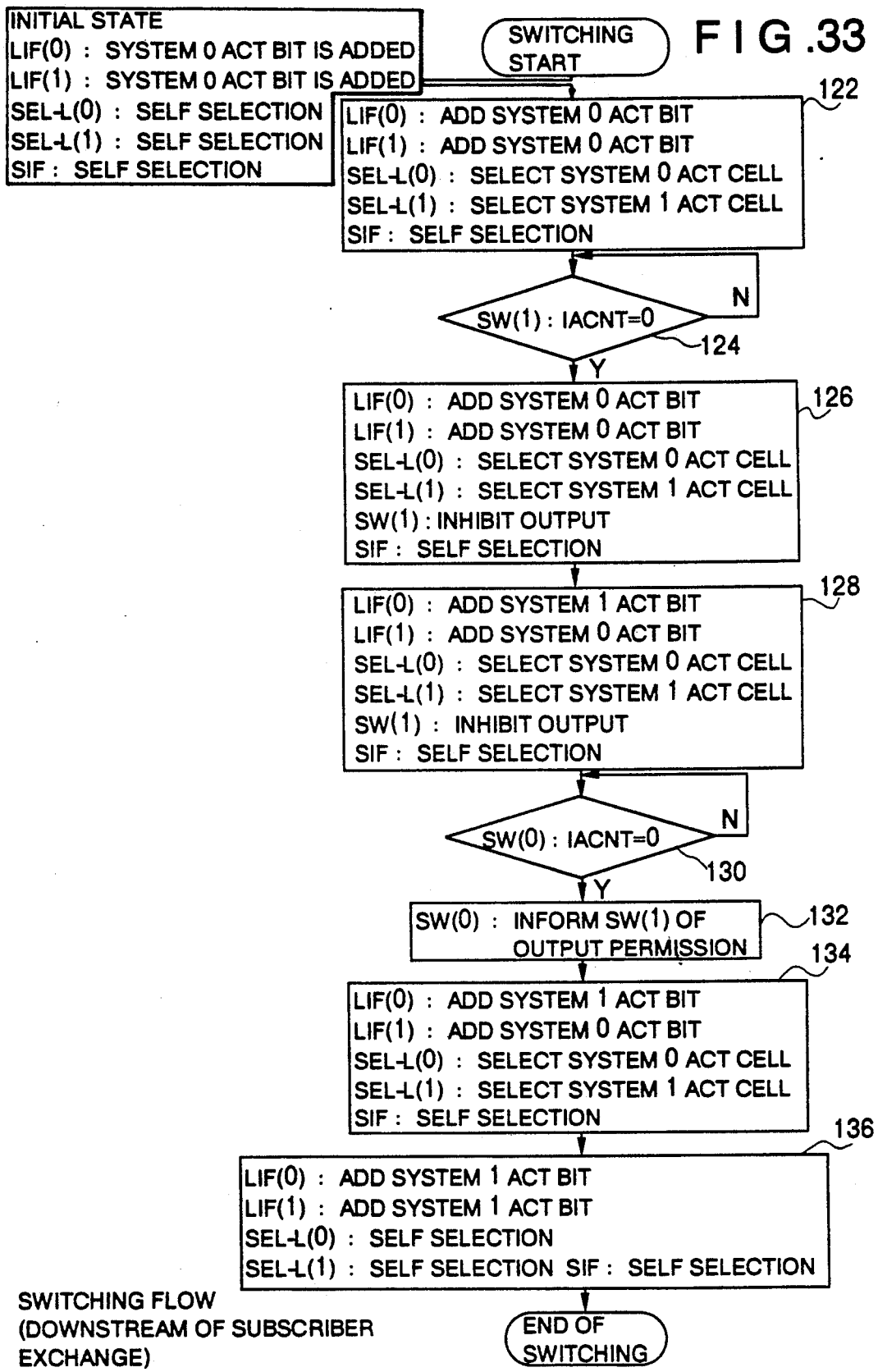

SYSTEM SWITCHING METHOD AND APPARATUS WITHOUT LOSS OF SIGNAL IN CELL SWITCHING SYSTEM OF ASYNCHRONOUS TRANSFER MODE

BACKGROUND OF THE INVENTION

The present invention relates to a technique for providing higher reliability of cell switching function of a switching system or a transmission system included in a communication network using an asynchronous transfer mode (hereafter abbreviated to ATM), and in particular to a system switching method, and apparatus, causing no loss o information at the time of system switching in a duplex operation system.

In conventional communication networks using a synchronous transfer mode (hereafter abbreviated to STM), it is possible to make the operation of a primary system of a switch portion synchronize with that of a standby system thereof so that loss of information at the time of system switching may be avoided. That is to say, loss of a bit due to switching is prevented provided that switch portions of both systems are synchronized with the precision of bit phase of a digital signal.

Cell switches in ATM communication networks switch information by taking data bits having a fixed length called a cell as the unit and routing information for switching is added to the header of the cell. Unlike the conventional STM switch in which switching is performed according to the bit position, the bit position cannot become information for switching.

In cell switches of an ATM, therefore, synchronizing the primary system and the standby system for the purpose of system switching impairs the advantage of the ATM in that switching is performed by labels of cell headers, and hence it is not effective means. Further, in the ATM, cells are buffered within the switch and hence it is difficult to control that Phase. It is thus difficult to prevent loss of information by means of simple switching as in the STM.

By the way, JP-A-63-70698 discloses a time division switching system of STM allowing continuation of communication without loss of signal when channels are rearranged during communication as occasion demands. However, it does not solve the above described problem.

SUMMARY OF THE INVENTION

An object of the present invention is to provide a system switching method and apparatus, of an ATM mode without causing loss o( signal and without synchronizing switches of the primary system and primary system.

Another object of the present invention is to provide a method and apparatus capable of realizing system switching causing no loss of signal in an ATM mode without newly adding a principal hardware element such as a buffer.

In order to solve the above described problems, an ATM system switching apparatus without loss of signal according to one feature of the present invention comprises means provided in an interface of the receiving side of the system switching apparatus such that information instructing that switching should be Performed by using only one of cell switches of two systems comprising the primary system and standby system in the interface portion of the apparatus, i.e., system selection information, and information for inhibiting output of the other cell switch, i.e., transmission inhibiting information may be added to the cell; means provided for each of the switches of the two systems for identifying that no cells are present in the buffer of each switch; and means for discarding cells stored in the buffer memory herein simply referred to as buffer) of each switch, at least one of the identifying means and the discarding means being provided.

Conventionally, the same cells are buffered in respective switches of the primary system and the standby system. In accordance with an aspect of the present invention, a first switch (such as the switch of the standby system, for example) is used at the time of system selection as a buffer until switching, and it is used to hold cells inputted until all of the cells stored in a second switch (such as the switch of the primary system) are outputted. That is to say, by adding system selection information, i.e., a system control bit to a received cell in the interface of the receiving side, cell inputting to the first switch of the duplex system is stopped. On the other hand, until all cells stored in the switch which is not selected are outputted, the second switch buffers cells inputted to the switch portion. This is made possible by inhibiting output by means of transmission inhibiting information after all contents of the first switch selected by the system selection information are discarded. Cells thereafter inputted are stored in the buffer of the proper switch. At the time when remaining cells in the switch selected by the system selection information are outputted, changeover to the other switch. By doing so, buffered information is outputted. Therefore, system switching can be conducted without loss of signal.

By using the method of the present invention as described above, system switching without loss of signal can be performed without synchronizing two cells of the primary system and standby system in transfer function broad-band of ISDN.

BRIEF DESCRIPTION OF THE DRAWING

FIGS. 2 to 11 are diagrams individually illustrating the operation of embodiments of the present invention, respectively;

FIG. 32 is a flow diagram showing the flow of a series of upper stream system switching operations shown in FIGS. 13 to 21; and FIG. 33 is a flow diagram showing the flow of a series of downstream system switching operations shown in FIGS. 22 to 31.

DETAILED DESCRIPTION OF THE EMBODIMENTS

Embodiments of the present invention will be hereafter described in detail by referring to the accompanying drawings.

Figure 1:
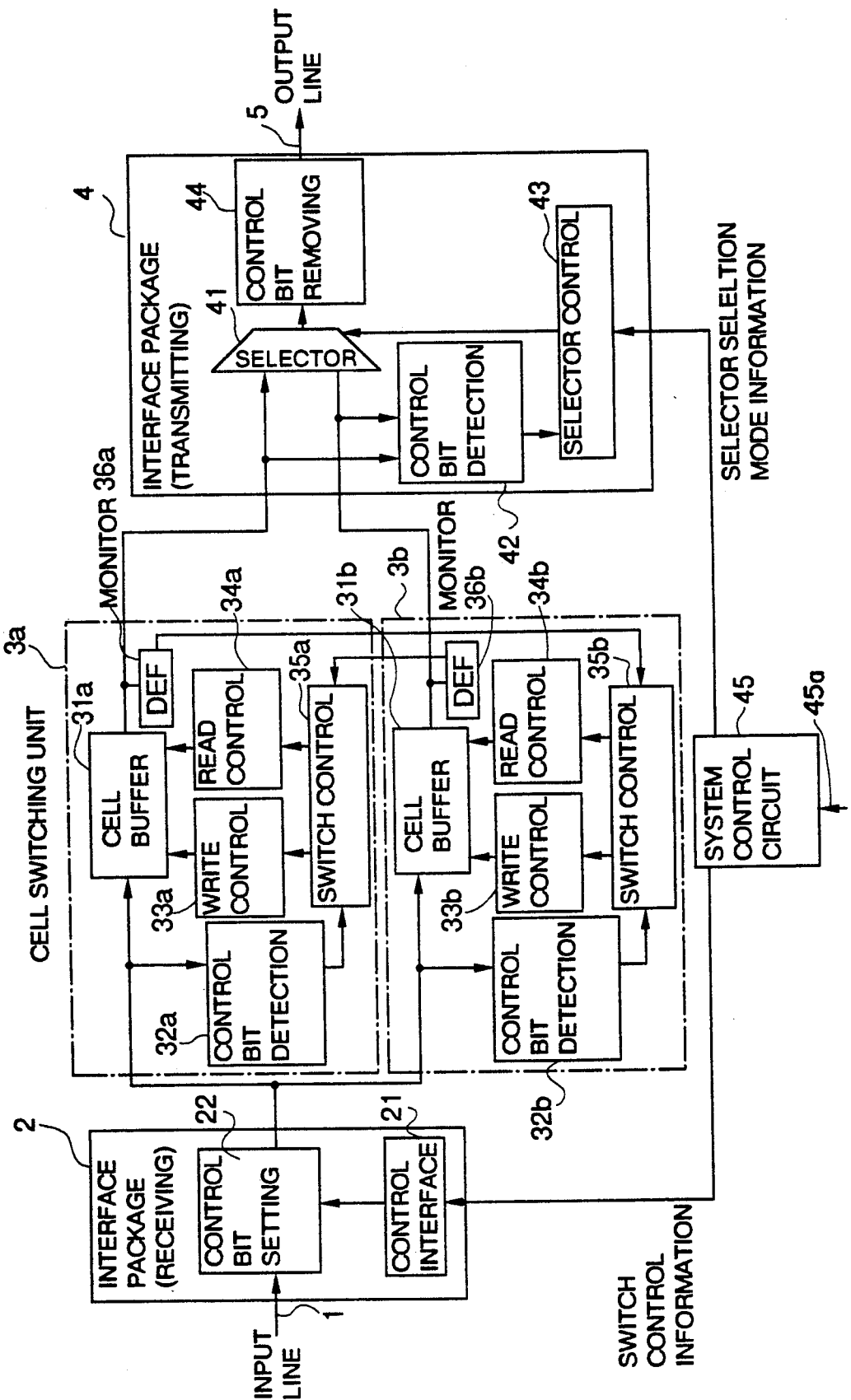
FIG. 1 is a block diagram of an ATM switching system showing a hardware configuration according to a basic embodiment of the present invention.

FIG. 1 is a block diagram showing the configuration of an ATM switching system according to a basic embodiment of the present invention.

Cells inputted to an interface package (or module) Z via a data input line 1 are inputted to cell switching circuits or cell transfer circuits 3a and 3b respectively forming the primary system and the standby system. Units 3a and 3b are also referred to as ATM switches of system 0 and system 1, respectively. In the receiving interface package 2, a control bit setting circuit 22 is controlled by a control command received by a control interface 21, and a control bit required for an inputted cell is added to the head portion of the cell. Since the operation speed within the switching system is typically so set as to he larger than that of the transmission path, the throughput of the overall system remains unchanged even after the control bit setting. In the cell switching circuits 3a and 3b, the control bit is received by control bit detecting circuits 32a and 32b. Depending upon contents of the received control bit, operation of cell buffers 31a and 31b is controlled by switch control circuits 35a and 35b via write control circuits 33a and 33b and read control circuits 34a and 34b. On output sides of the cell buffers 31a and 31b, monitor circuits or surveillance circuits 36a and 36b for discriminating contents of buffers such as presence or absence of stored cells are provided. Further, cells from the buffers 31a and 31b are inputted to a transmitting interface package 4, and contents of the control bit are separated again in a control bit detecting circuit 42. Depending on which system is selected by the separated control bit, a selector 41 is controlled by a selector control circuit 43. The output of the selector becomes an output 5 to the transmission path. A removing circuit 44 for removing the control bit added to the cell is provided on the output side of the selector 41. Instead of this removing circuit 44, logic gates for removing a control bit from the cell may be added to the selector 41. A block 45 represents a system control circuit or system administration unit which issues switch control information and selector selection mode information respectively to the control interface 21 and the selector control circuit 43, and which includes a circuit for executing scheduler function of scheduling and controlling the operation of the input interface 2 and the output interface 4 and for executing a control program such as a microprogram.

System control circuit 45 responds to a system switch as exchange request signal 45a. The following is a listing of switch control information provided to interface packages 2 and 4:

(1) commands to receiving part of interface package 2:
  Control appending of system selection bit,
  Activate both primary (0) and standby (1) systems,
  Activate system 1,
  Activate system 0,
  Control transmission for switch clear instructions,
  Clear system 1 switch,
  Clear system 0 switch,
  Control transmission for switch output stop,
  Stop system 1 switch output,
  Stop system 0 switch output,
  Control last indicator transmission.
(2) Commands to transmitting side of interface package 4;
  Selector control signal,
  System 1 switch forced selection,
  System 0 switch forced selection,
  Selection based on system selection bit.
(3) Collect information on system status.

For brevity of description, each of the interface boards 2 and 4 is shown as one sheet. As in embodiments hereafter described, however, interface boards of two systems may be provided so as to be respectively associated with the cell switching circuits 3a and 3b.

The switch control information issued by the system control circuit 45 comprises information for instructing insertion of system selection bits of both systems to the received cell, information for ordering addition of system 0/system 1 selection bit information for ordering transmission of system 1 switch clear selection bit, information for instructing output stoppage of system 1 cell transmission, and information for ordering addition of system 1 selection bit and addition of last indicator information to the last cell The selector selection mode information issued by the system control circuit 45 comprises system 0 forced selection mode information and system 1 forced selection mode information for selecting the system 0 or the system 1 without regard to the head information of the transmitted cell, and sell selection mode information for selection the output cell of the system 0 or the system 1 on the basis of the output of the control bit detecting circuit 42, i.e., the head information of the transmitted cell.

The monitor circuits 36a and 36b are connected to the switch control circuits 35b and 35a respectively of the units 3b and 3a, respectively. These monitor circuits 36a and 36b supply signals used for controlling the permission for /prohibition against the cell transmission.

Each of FIGS. 2 to 11 schematically shows the system switching operation using the system configuration of FIG. 1 according to an embodiment of the present invention, and shows the cell storage state within each cell buffer.

Figure 2:
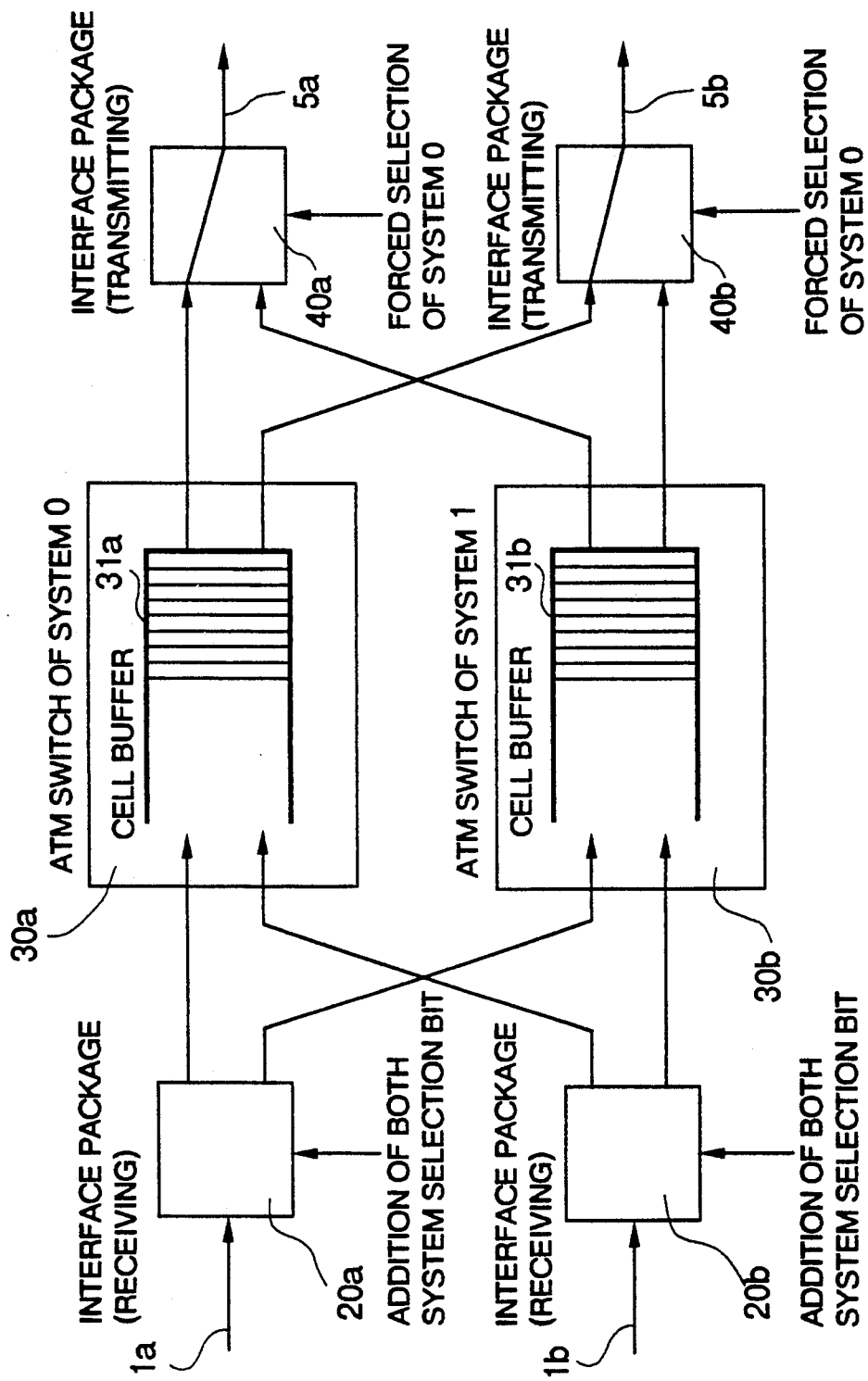

FIG. 2 shows the normal status action. In each of receiving interface packages 20a and 20b, a control bit is added to a received cell by the associated control bit setting circuit, and system selection bits associated with respective systems are set as active status in both systems as contents thereof. In both cell switching circuits 30a and 30b, normal switching action is taken. In transmitting interface packages 40a and 40b, cells of the system 0 are forcibly selected and data outputs 5a and 5b are outputted to the transmission path.

Figure 3:
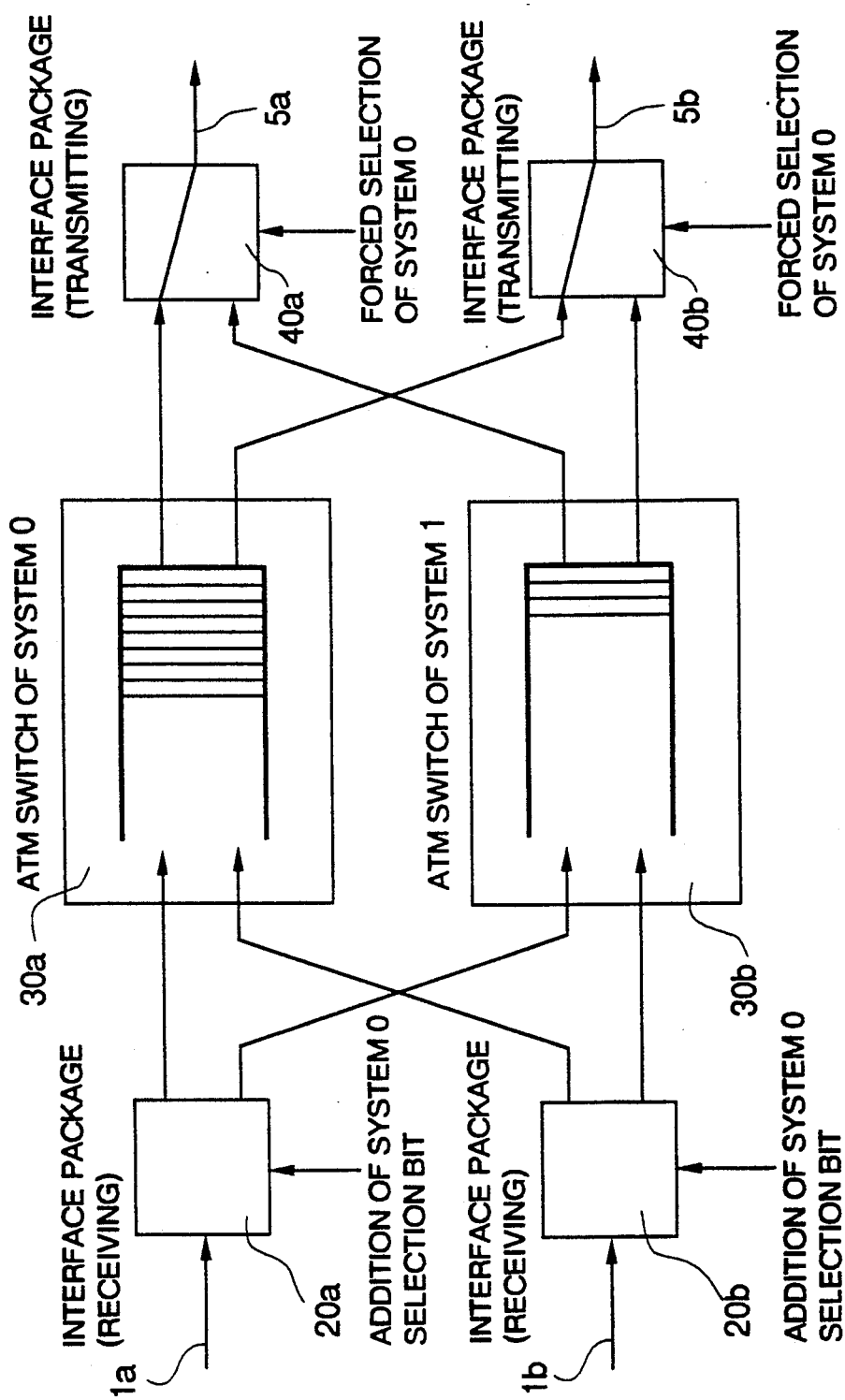

In the operation step shown in FIG. 3, only the system 0 selection bit of the cell within the apparatus is set as an active status by an added control hit. In this state, the cell switching circuit 30b of the system 1 detects the system selection bit for its own system in being void and discards the received cell. The cell discarding function is accomplished by inhibiting the write control circuit 33b from writing or updating it by means of the control circuit 35b. As a result, cells stored in the buffer of the cell switching circuit 30b of the system 1 are subject to only transmission and hence they decrease with the lapse of time.

Figure 4:
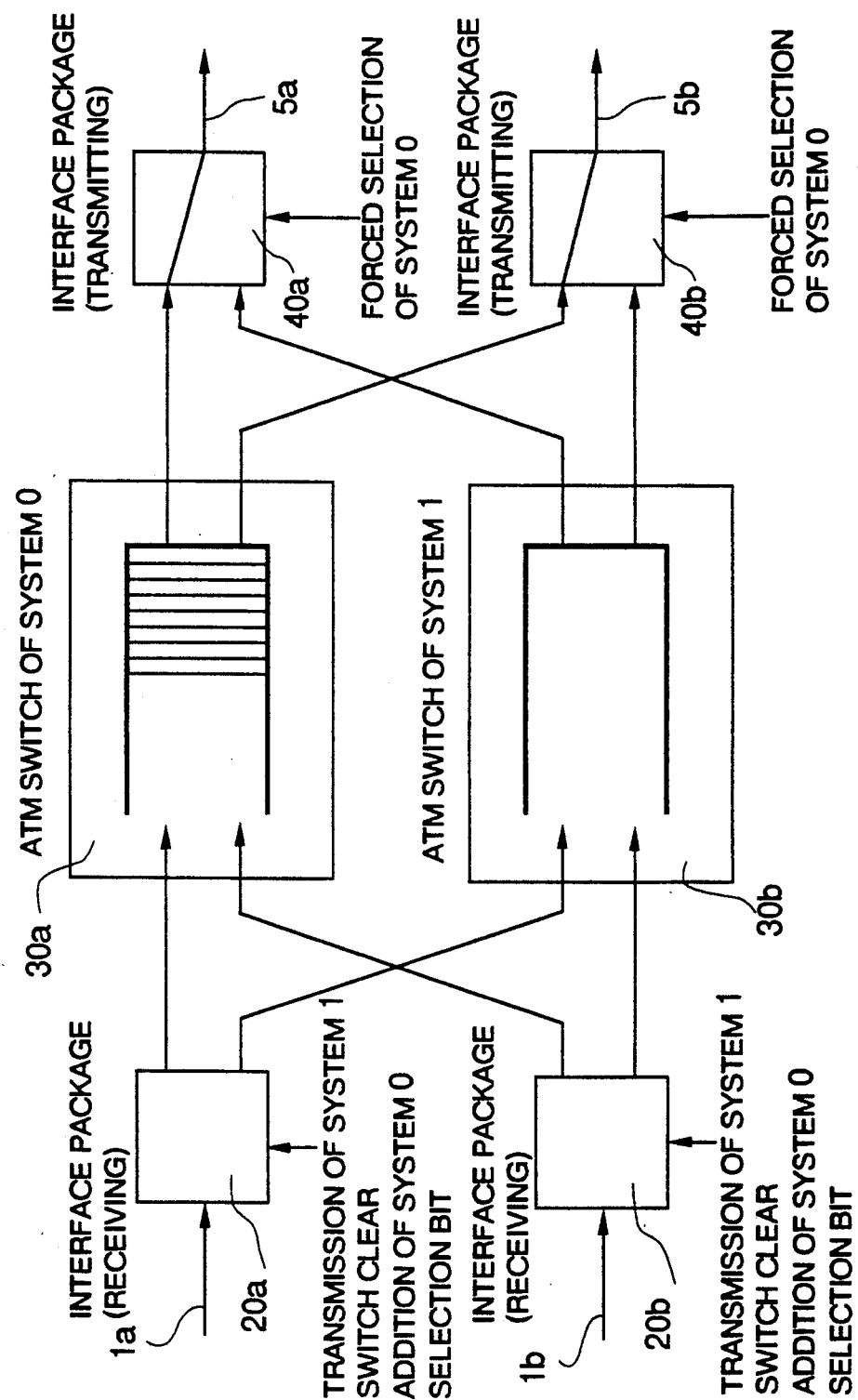

In the operation step shown in FIG. 4, each of the interface packages 20a and 20b adds a control hit for clearing the buffer of the cell switching circuit of the system 1 to the header of a received cell while keeping the system 1 selection bit of the cells stored within the apparatus void. Concurrently with receiving this control bit, the cell switching circuit 30b of the system 1 discards all cells stored in its own buffer. Since the system 1 selection bit shows voidness, the write control circuit 33b, for example, clears the contents of the buffer by means of the control bit. All of the received cells are discarded instantly. The buffer of the system 1 is always in the idle state.

Figure 5:
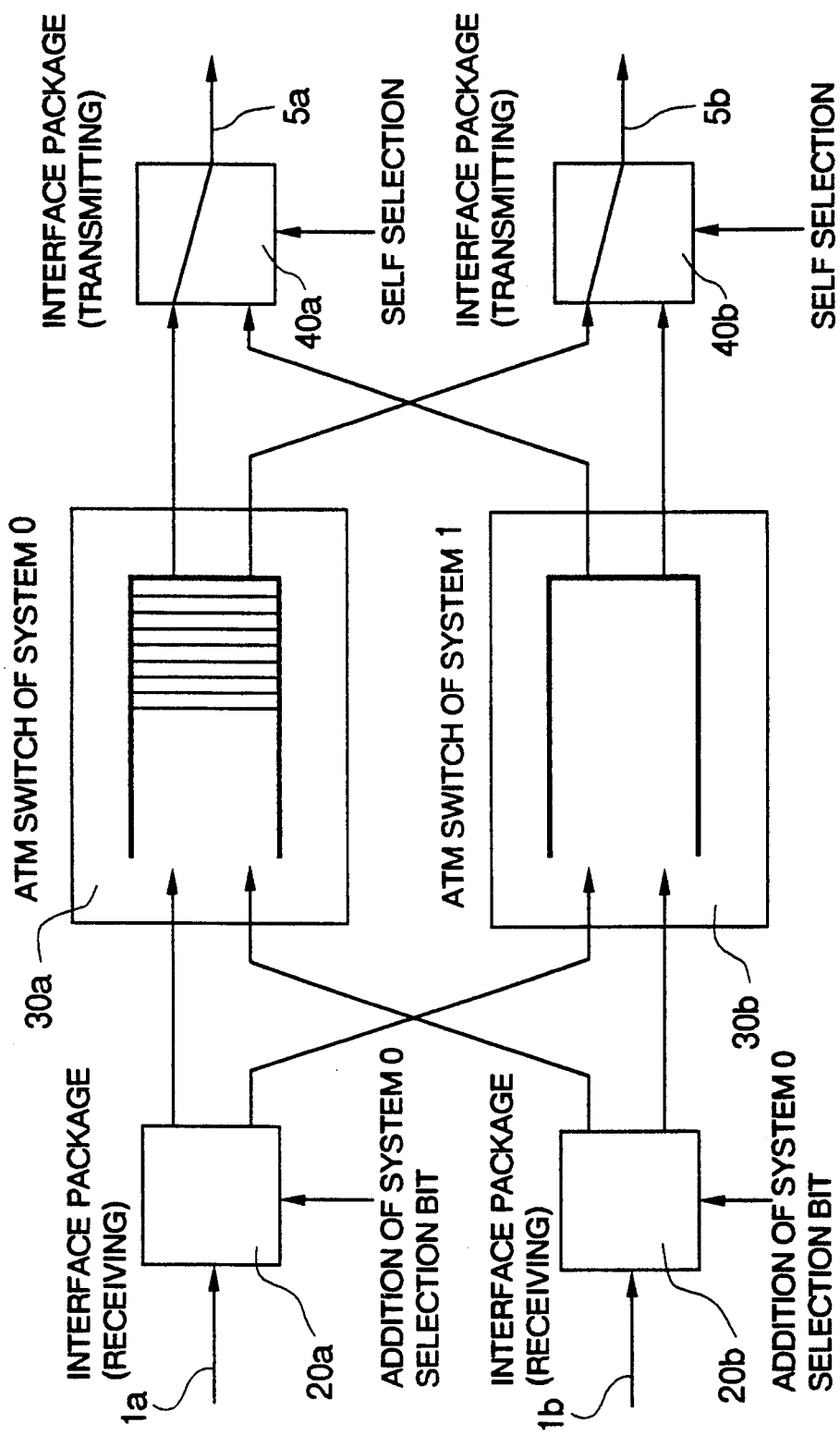

In the operation step shown in FIG. 5, the selectors so disposed in the interface packages 40a and 40b as to select outputs of the cell switching circuits 30a and 30b are set at the self selection mode by the selector control circuit. In this state, the control bit set in the cell indicates that only the switch of system 0 is active in accordance with the system selection information detected from the cell stored within the apparatus. Thereby the selector selects the signal of the switch of the system 0 in a self-controlled manner.

Figure 6:
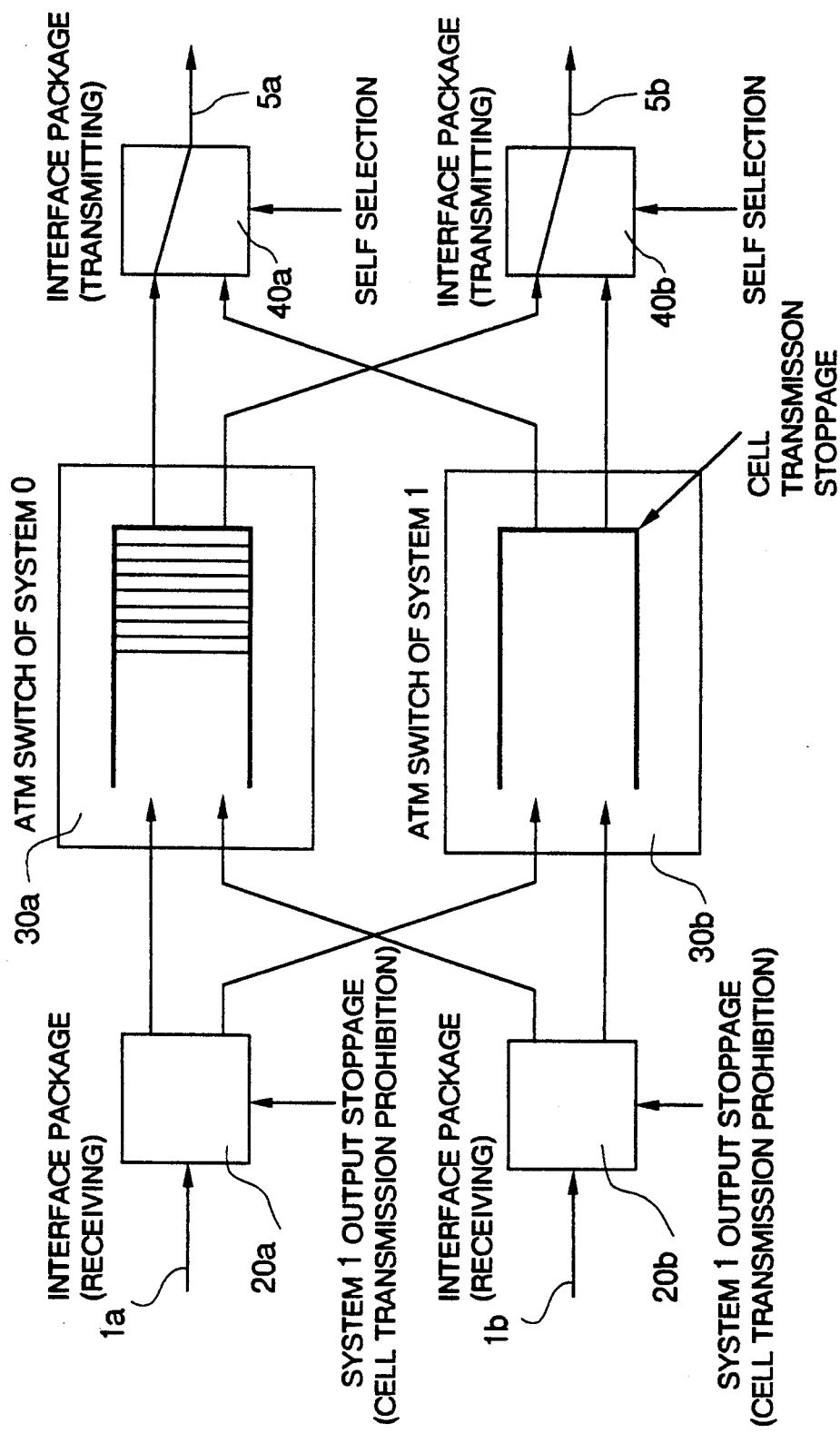

In the operation step shown in FIG. 6, each of the interface packages 20a and 20b add a control bit for inhibiting the cell switching circuit of the system 1 from transmitting a cell to the header of a received cell while keeping the system 1 selection bit of the cell stored in control circuit and the read control circuit are controlled by the circuits 32b and 35b, write operation to the buffer is enabled and read operation is disabled. Concurrently with receiving this control bit, therefore, the cell switching circuit 30b of the system 1 stops the operation of transmitting cells to the succeeding stage.

In the operation step shown in FIG. 7, in the wake of the state of system 1 cell transmission stoppage of the step of FIG. 6, the interface packages 20a and 20b makes the system 1 selection bit of the cell stored in the apparatus active and makes the system 0 selection bit void concurrently therewith. At that time, each of the interface packages 20a and 20b adds a control bit indicating that to the header of the last cell of a received cell train having active system 0 selection bits among cell stored in the apparatus. This is referred to as last indicator cell. In this state, the cell switching circuit 30a of the system 0 detects the system selection bit for its own system in being void, and discards the received cell. Further, cell transmission to the succeeding stage remains inhibited in the cell switching circuit 30b of the system 1. Therefore, only writing the received cell into the buffer is performed, and the number of cells in the buffer increases with the lapse of time.

Figure 8:
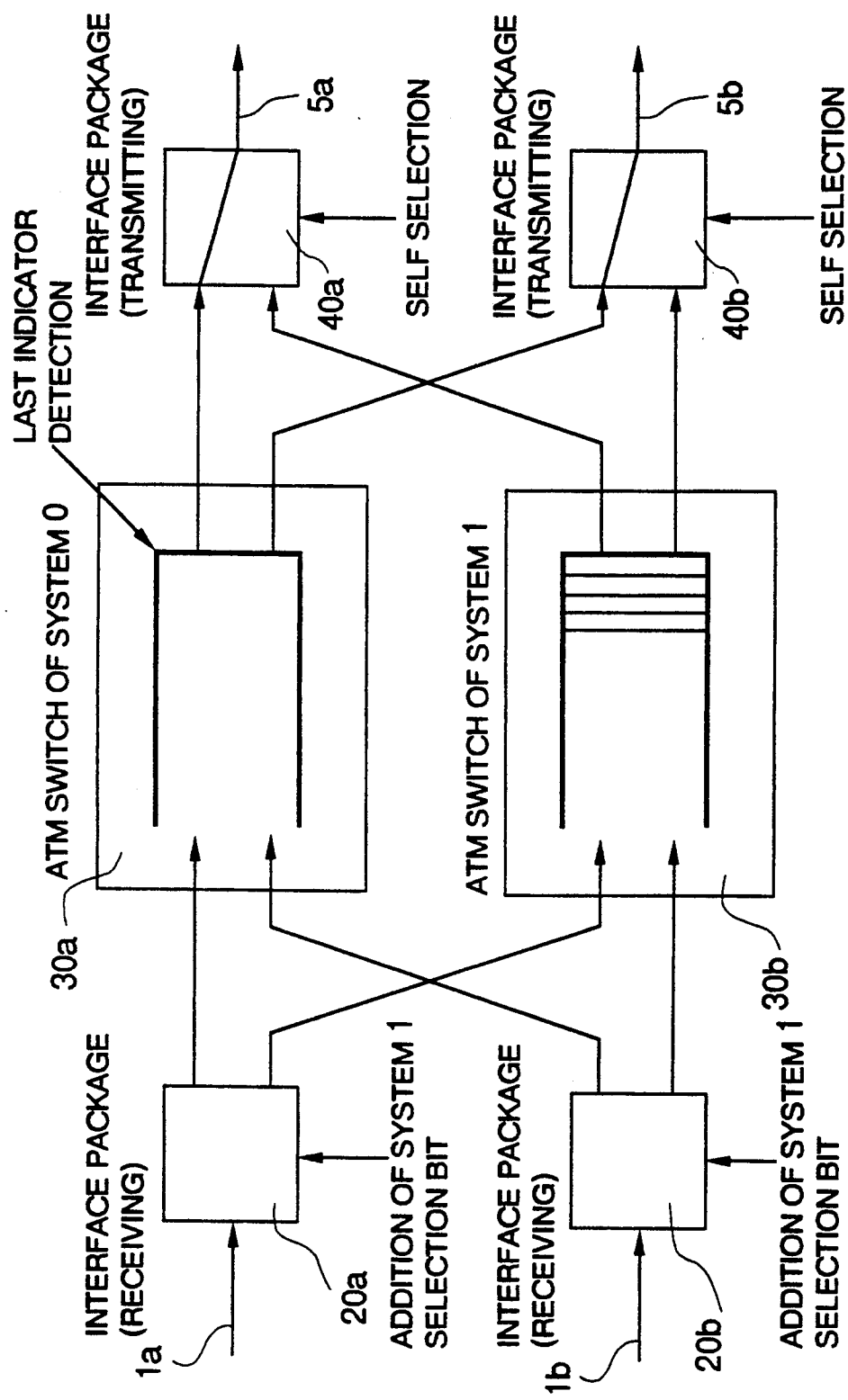

Succeedingly, in the step shown in FIG. 8, the number of remaining cells in the cell switching circuit 30a of the system 0 is decreased with the lapse of time by the cell read operation using the clock. The last indicator cell which remains lastly is transmitted from the cell switching circuit 30a. At this time, the monitor circuit 36a of the cell switching circuit 30a of the system 0 detects this. At this step, the interface packages 20a and 20b adds system 1 selection bits to the received cells 1a and 1b.

Figure 9:
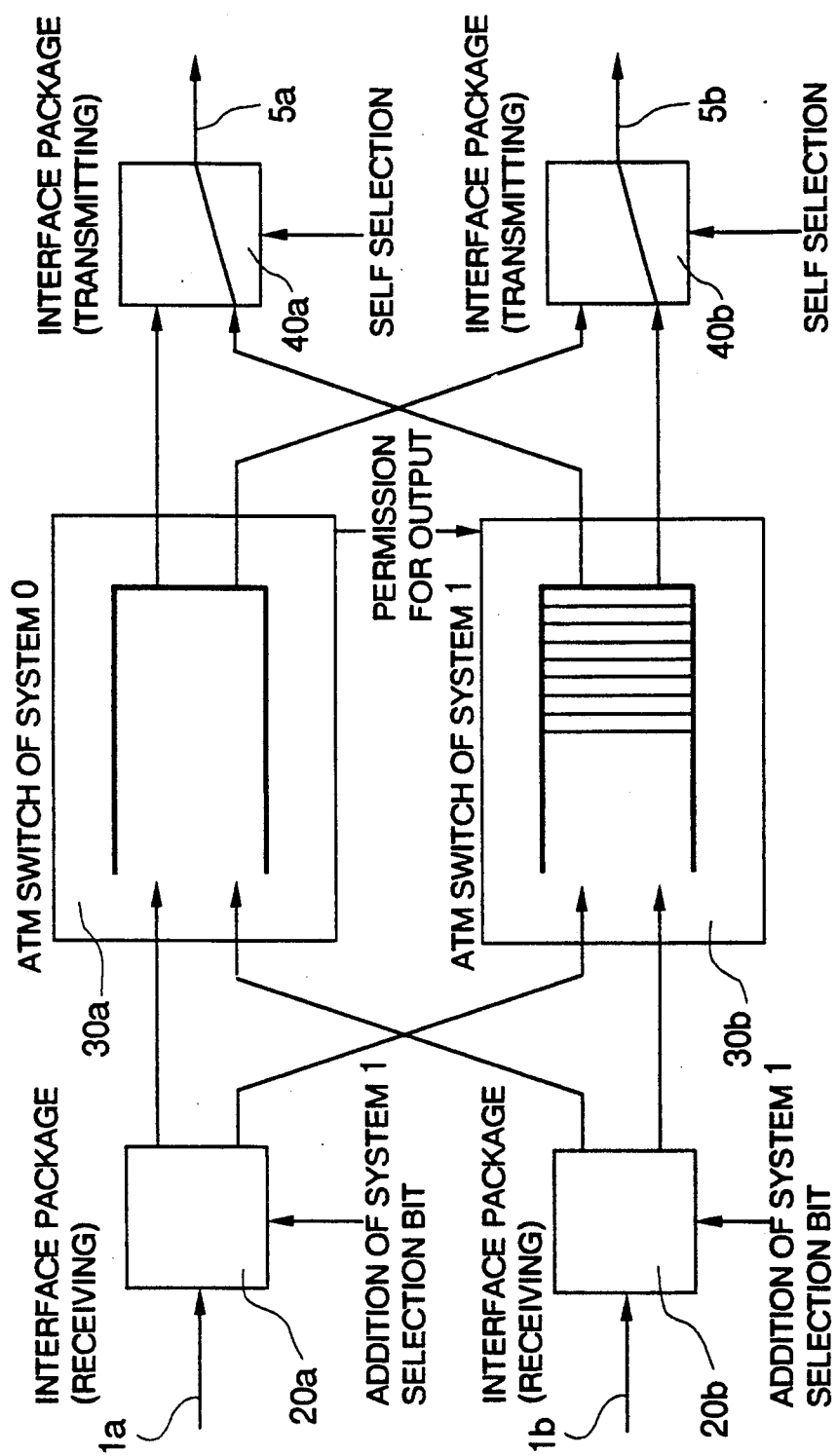

Succeedingly, in the step shown in FIG. 9, with respect to the buffer which has received a cell having the system 1 selection bit added thereto, the monitor circuit 36a of the cell switching circuit 30a of the system 0 detects the transmission of the last indicator cell, and thereafter transmits a signal for Permitting cell transmission to the cell switching circuit 30b of the system 1. In response to this transmission permitting signal, the switch control circuit 35b cancels the read inhibiting operation of the read control circuit. After receiving this signal, the cell switching circuit 30b of the system 1 starts cell transmission to the succeeding state, i.e., the transmitting interface package 4. Upon receiving a cell having an active selection bit of the system 1, the selectors in the interface packages 40a and 40b succeeding the cell switching circuits selects and outputs this cell in a self-controlled manner.

Figure 10:
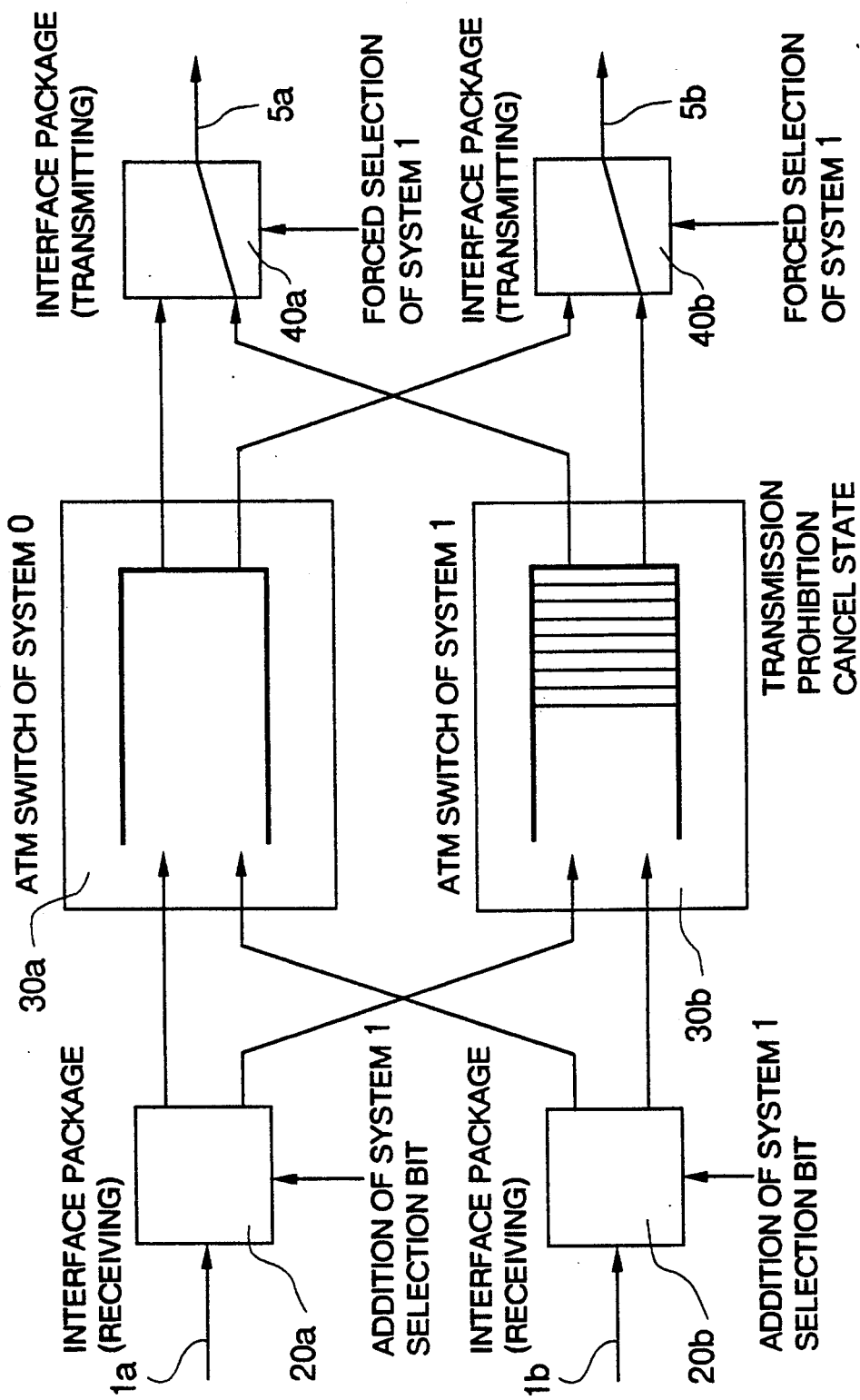

At the step shown in FIG. 10, the system 1 forced selection mode is set in the selectors included in the interface packages 40a and 40b succeeding the cell switching circuits as selector selection mode information. As a result of the step of FIG. 9, the cell switching circuit 30b is in such a state that the prohibition of the cell transmission is canceled.

Figure 11:
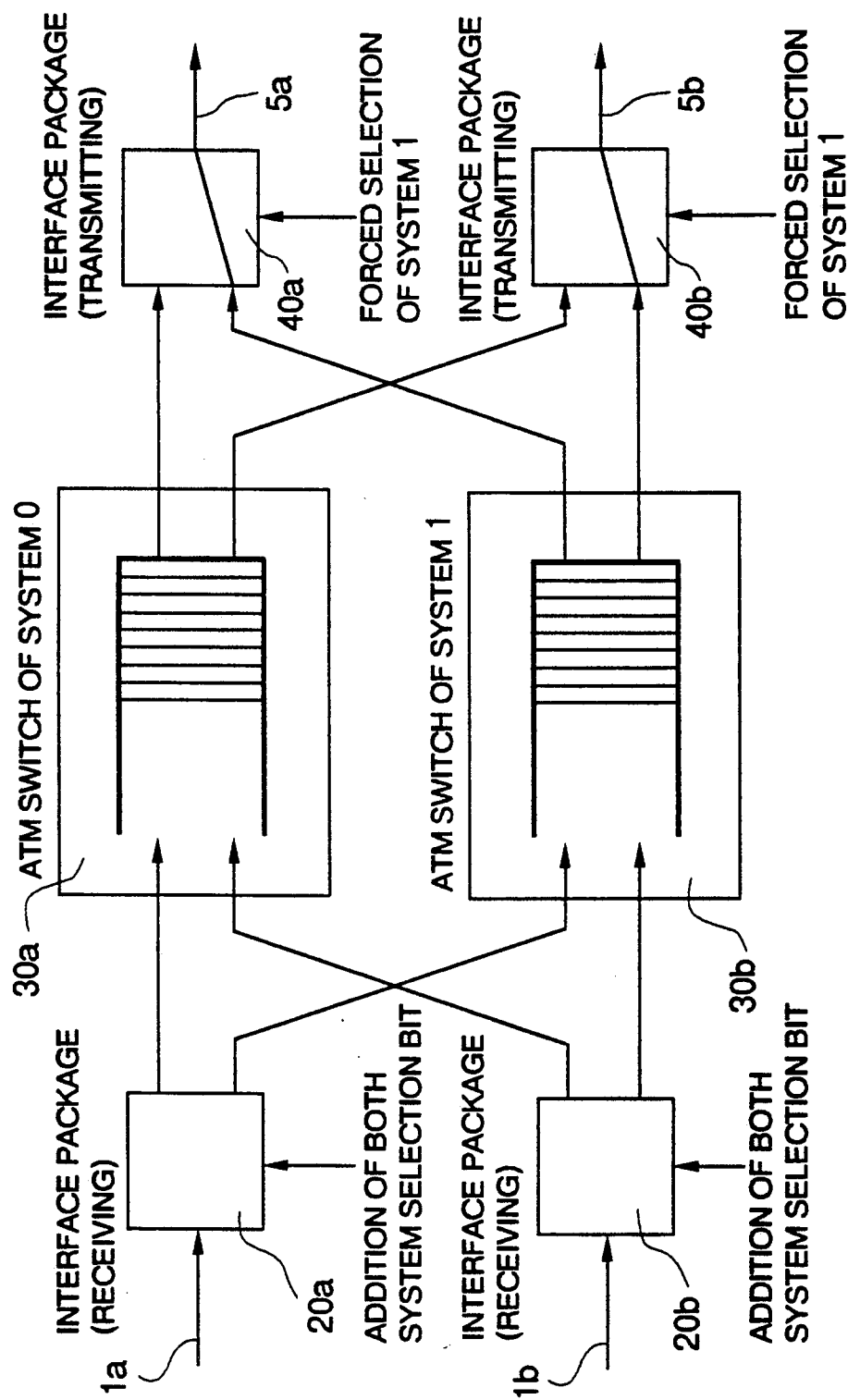

At the step shown in FIG. 11, system selection bits added to cells stored in the apparatus by the interface packages 20a and 20b are set as an active state for both systems. The cell switching circuits 30a and 30b of both systems conduct conventional switch operation, and cells of the system 1 are forcibly selected by the selectors of the succeeding stage.

Figure 12:
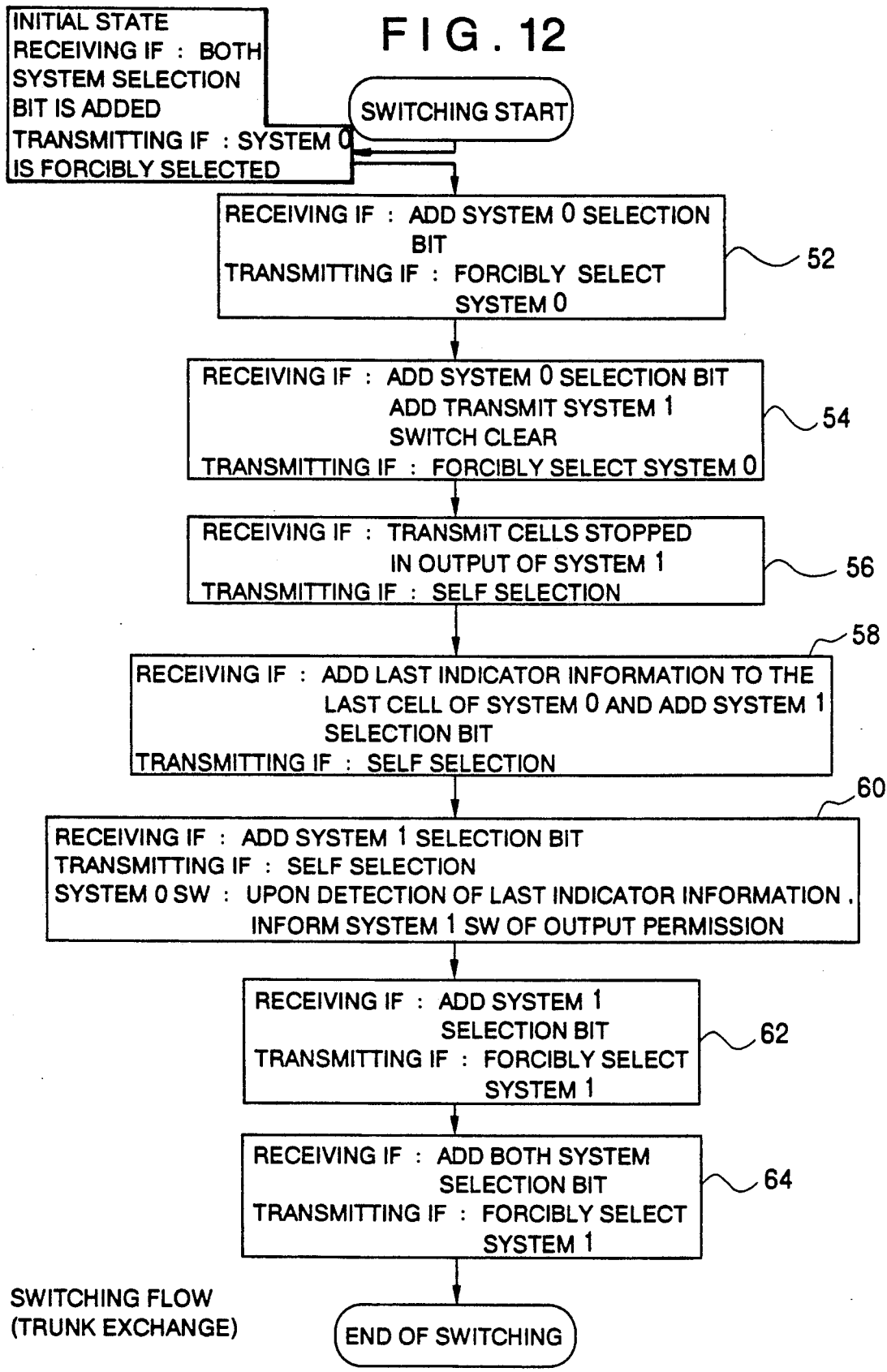
FIG. 12 is a flow diagram showing the flow of system switching operation of FIGS. 2 to 11.

FIG. 12 is an operation flow chart showing the flow of the case where individual steps shown in FIGS. 2 to 11 are applied to system switching without loss of signal in a trunk exchange. As the initial state herein, the system selection bit is added as the control bit in the receiving interface, and forced selection of the system 0 is set into the selector in the transmitting interface (step 52). Thereafter, cell switching of the ATM mode is accomplished via steps 51 to 64.

Thus, in accordance with the method of the present embodiment, all of active cells of the system 0 are transmitted, and thereafter active cells are transmitted from the system 1. This results in a feature that the order of cells passing through the same path is always assured.

FIGS. 13 to 31 show system switching methods of the ATM mode without loss of signal according to another embodiment of the present invention.

The present embodiment relates to system switching without loss of signal of a switching system, such as a local switching system placed between terminals and a trunk exchange, having such a configuration that the cell switching function and one interface package are duplexed.

In this case, the interface connected to a single line of the terminal side is not duplexed. Therefore, the system switching procedure differs depending upon the cell transfer direction. Herein, the case where cells are transferred from the interface package which is not duplexed to the duplexed interface package is referred to as "upstream", and the opposite case is referred to as "downstream".

SYSTEM SWITCHING WITHOUT LOSS OF SIGNAL IN UPSTREAM DIRECTION

Respective steps of the flow of switching to the standby system in cell transfer function of the upstream direction are shown in FIGS. 13 to 21.

The configuration of the transmitted cell switching system of the upstream direction shown in FIGS. 13 to 21 and the outline of the operation of this switching system will now be described. Cells inputted from a subscriber line 100 to a subscriber interface (SIF) package 200 are inputted to cell switching circuits 300a and 300b via selectors of subscriber side (SELS) 500a and 500b comprising gates. The cells switched by the cell switching circuits 300a and 300b are outputted to interfaces of office line side or line interfaces (LIFs) 400a and 400b via selectors of office line side (SELL) 601a and 601b comprising gates.

Further, the cell switching circuits 300a and 300b comprise cell buffers 310a and 310b and idle address counters (1ACNT) 320a and 320b for counting the quantity of idle addresses included in those buffers, respectively. The idle address counters 320a and 320b form substitute means for the monitor circuits 36a and 36b of FIG. 1. Each cell switching circuit comprise means ±or informing the other cell switching circuit of idle information. Contents of the counter are transmitted to the cell switching circuit of the other party and used for transfer control.

Figure 13:
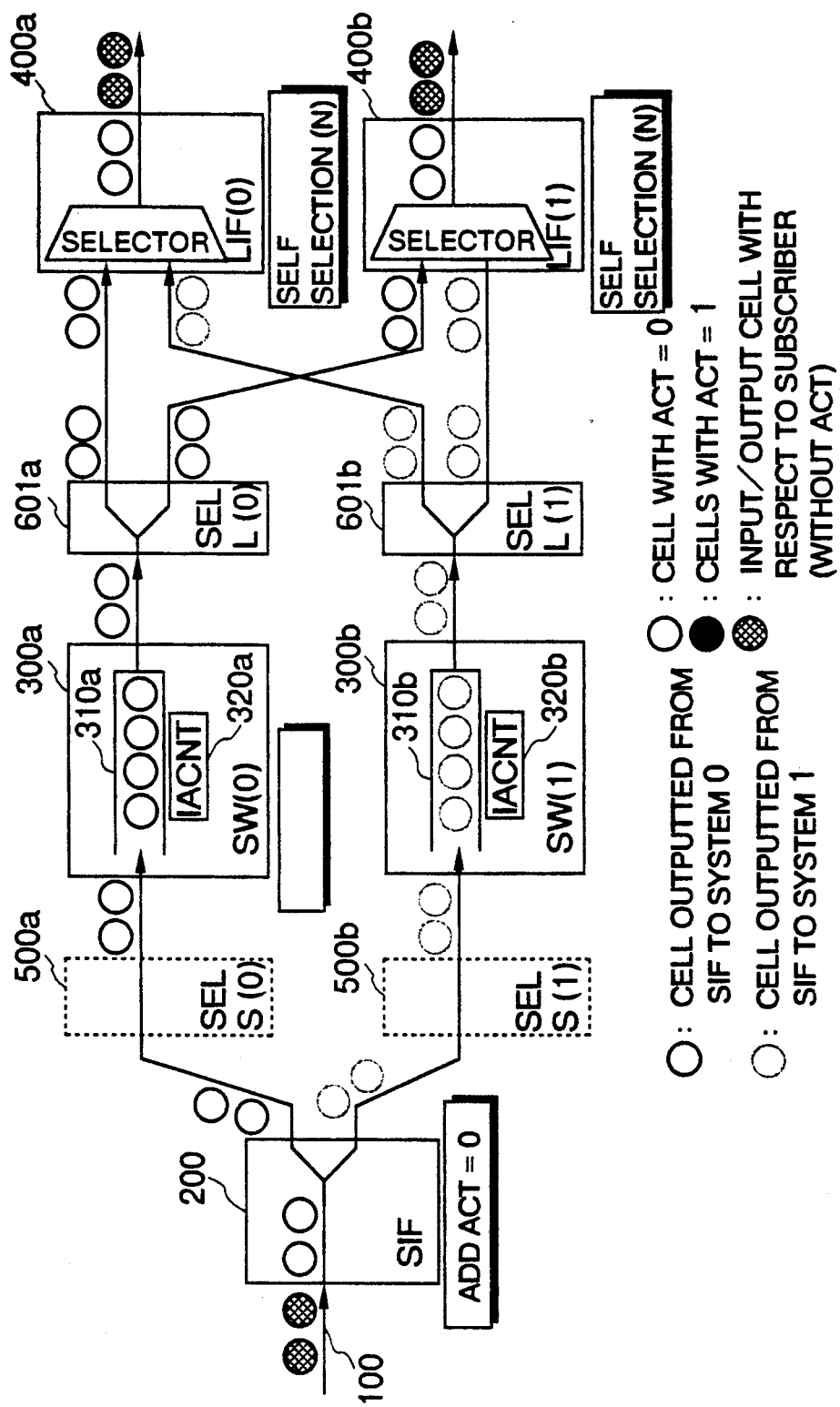
FIGS. 13 to 31 are diagrams individually illustrating the operation of other embodiments of the present invention, respectively.

FIG. 13: The active state indicating that the cell switching circuit of the system 0 has received transfer selection is the initial state. Also, the system 0 serves as the primary system. The system selection bit of cells is set at 0. Therefore, ACT=0 indicating the system 0 selection bit is added to the header of the inputted cell by the SIF 200. Selectors disposed at inputs of the interface packages (LIF) 400a and 400b has self selection mode (N). In this mode, cells having system selection =0 (ACT=0) are selected for input of system 0 and cells having system selection =1 (ACT=1) are selected for input of the system 1.

Figure 14:
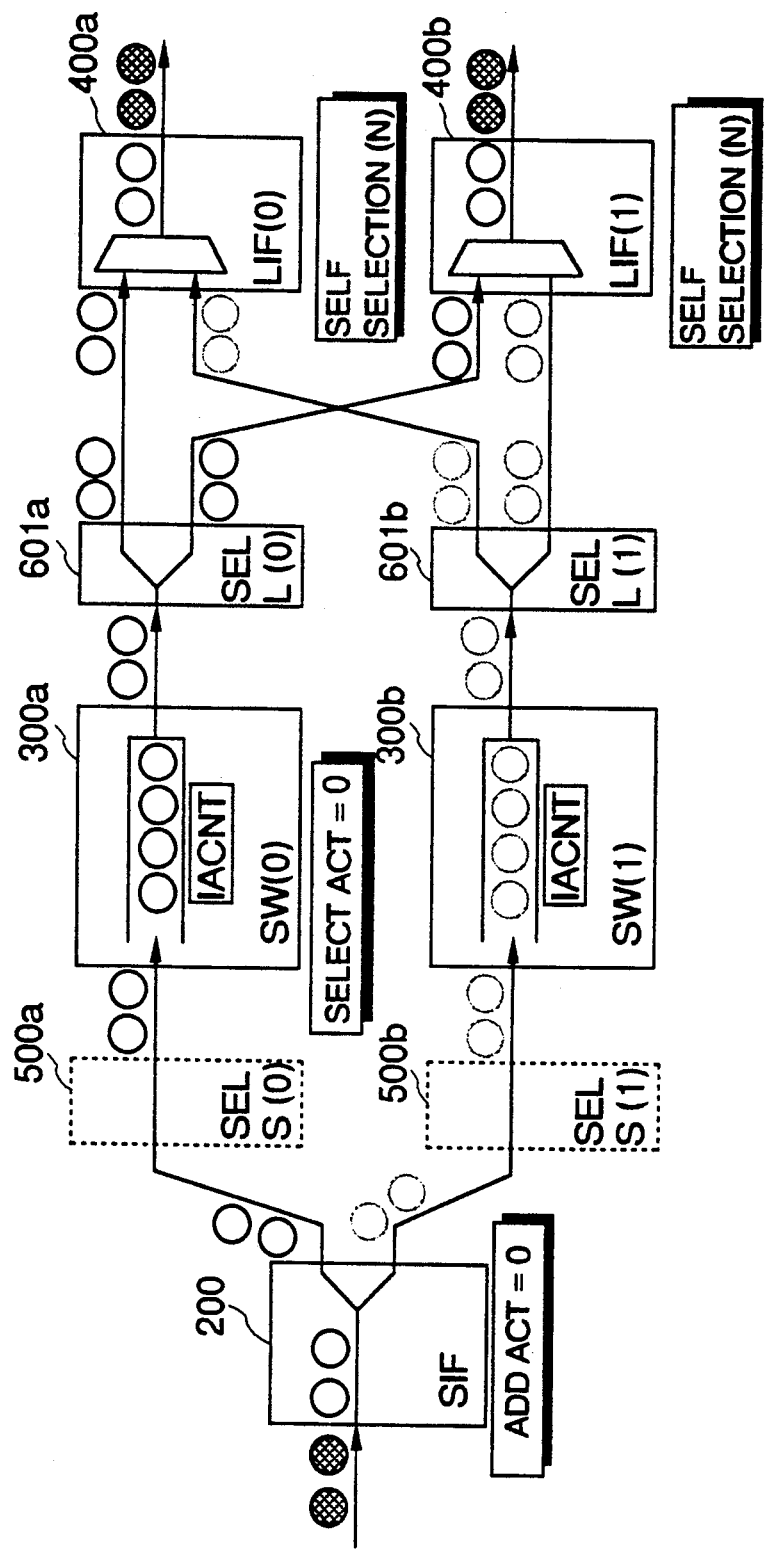

FIG. 14: Forced selection of cells of the system 0 is specified for the cell switching circuit of system 0.

The cell switching circuit 300a of system 0 is so set that only cells of the system 0 are selected. That is to say, it is ordered to discard cells with the system selection bits being equivalent to 1. This aims at releasing all cells of the system 0 after the system switching and before cells of the system 1 are outputted by the cell switching circuit 300b of the system 1. Any change in system operation is not caused by this manipulation.

Figure 15:
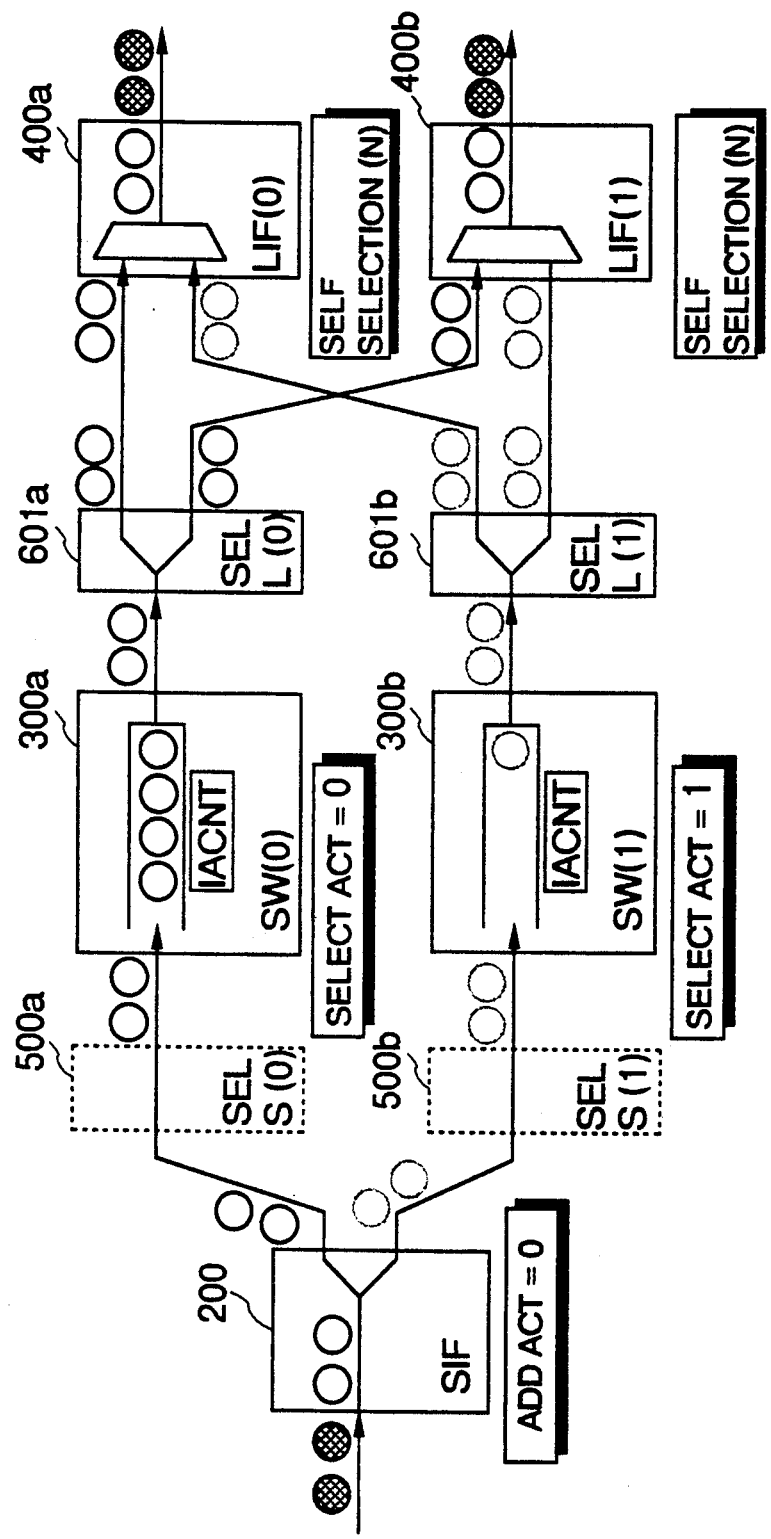

FIG. 15: Forced selection of cells of the system 1 is specified for the cell switching circuit of system 1.

The cell switching circuit 300b of system 1 is so set that only cells of the system 1 are selected. That is to say, it is ordered to discard cells with the system selection bits being equivalent to 1. This aims at forcibly discarding cells stored in the cell switching circuit 300a of the system 0 and buffering only the cells of the system 1.

Figure 16:
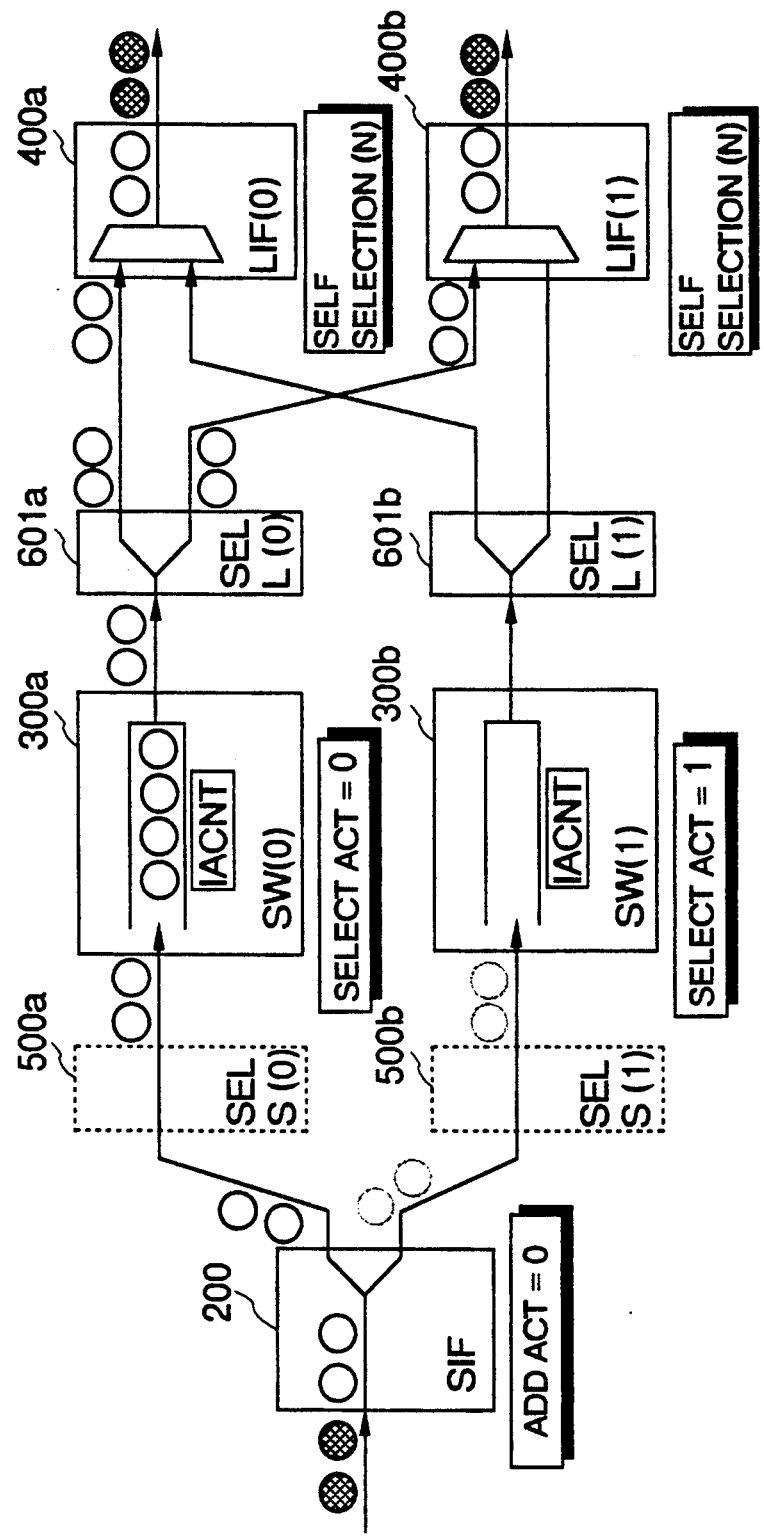

FIG. 16: Cell switching circuit of system 1 is forced to discard cells.

The state after cells stored in the cell switching circuit 300b of the system 1 have been forcibly discarded is shown.

Figure 17:
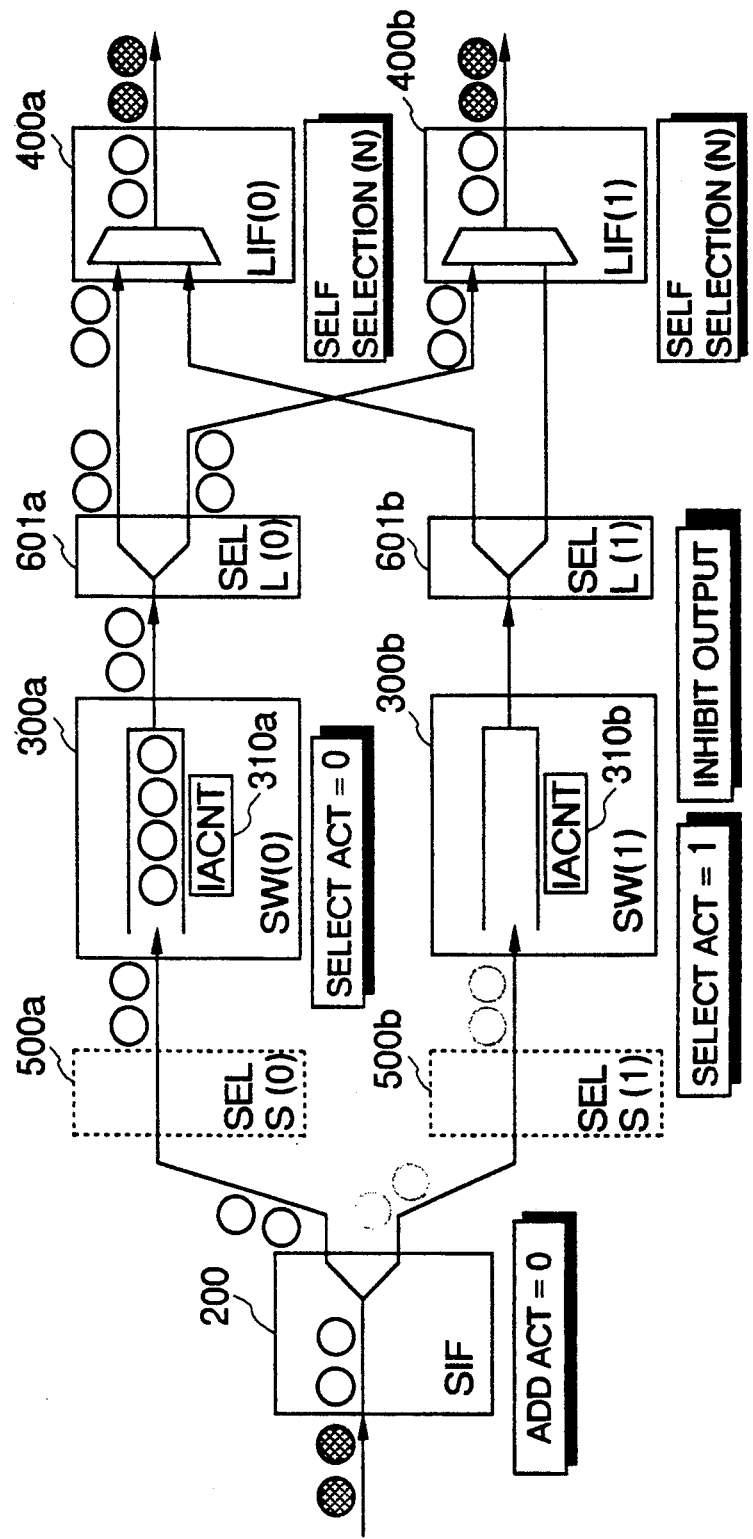

FIG. 17: Output prohibition for cell switching circuit of system 1 is set.

The cell switching circuit 300b of the system 1 is inhibited from outputting cells. This aims at preventing inversion of cell order by inhibiting the cell switching circuit 300b of the system 1 from outputting cells until all of the cells buffered in the cell switching circuit 300a of the system 0 are released.

Figure 18:
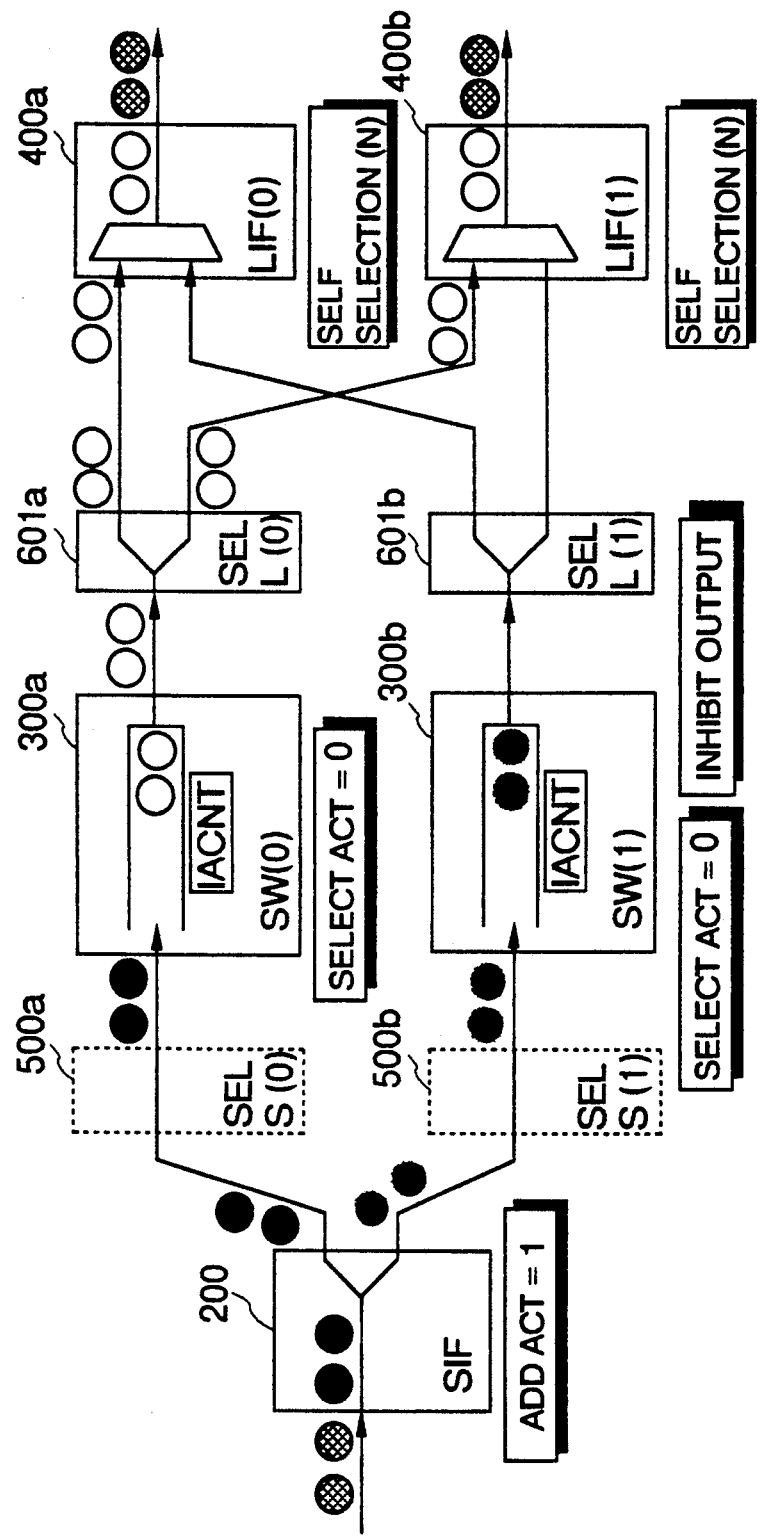

FIG. 18: Outputting cells of system 1 is specified for the interface 400 which is not duplexed.

The interface 200 which is not duplexed is ordered to output succeeding cells to the system 1. To be concrete, system selection bits of succeeding cells are set at 1. Thereby succeeding cells are stored only in the cell switching circuit 300b of the system 1, and cells are discarded in the cell switching circuit 300a of the system 0.

Figure 19:
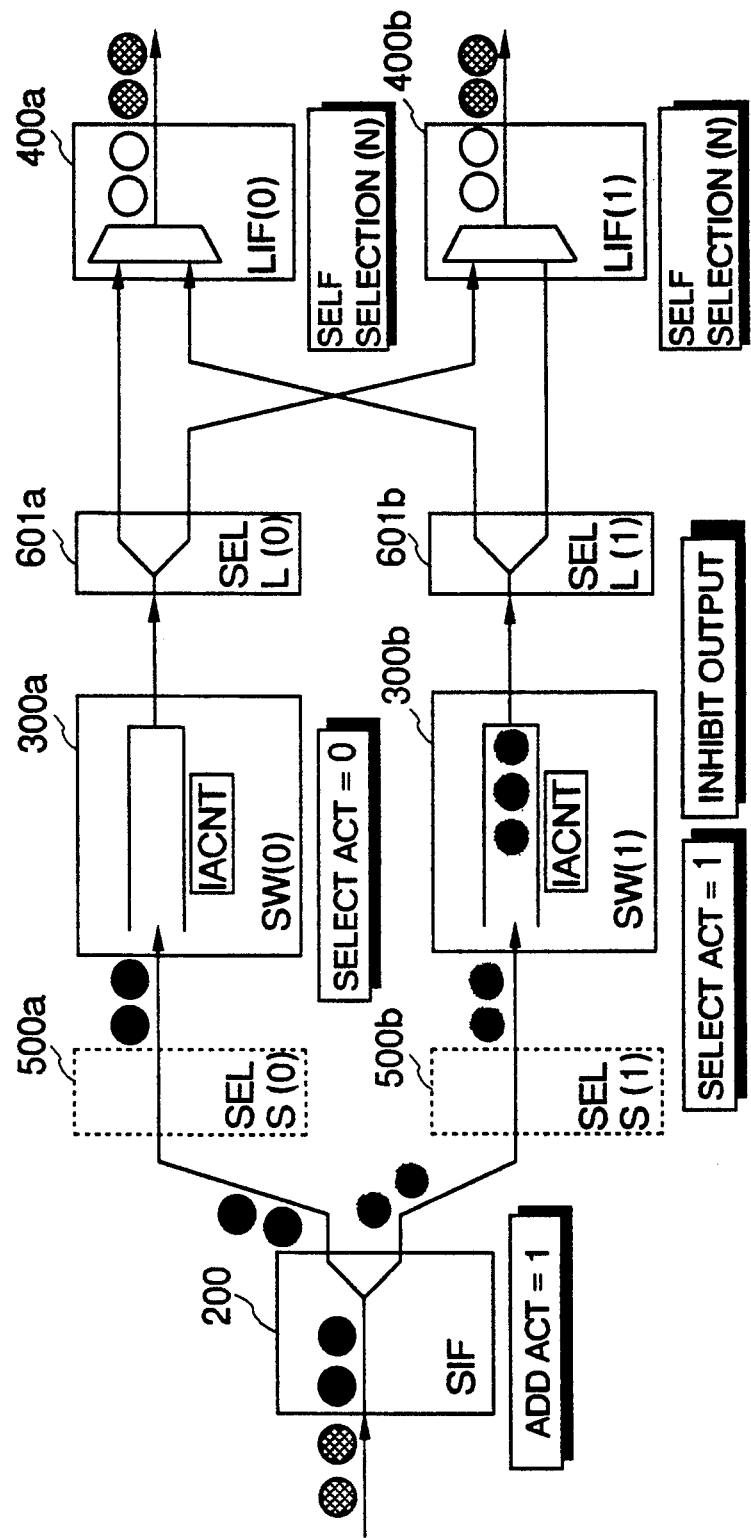

FIG. 19: Cell switching circuit of system 0 is forced to discard cells.

Cells with system selection =1 are no longer stored in the cell switching circuit 300a of the system 0. Therefore, cells of the system 0 are outputted until the buffer becomes empty. As a result, the IACNT 340a detects the buffer in being empty, generates a detection signal, and transmits it to the cell switching circuit 300b as an output permission signal.

Figure 20:
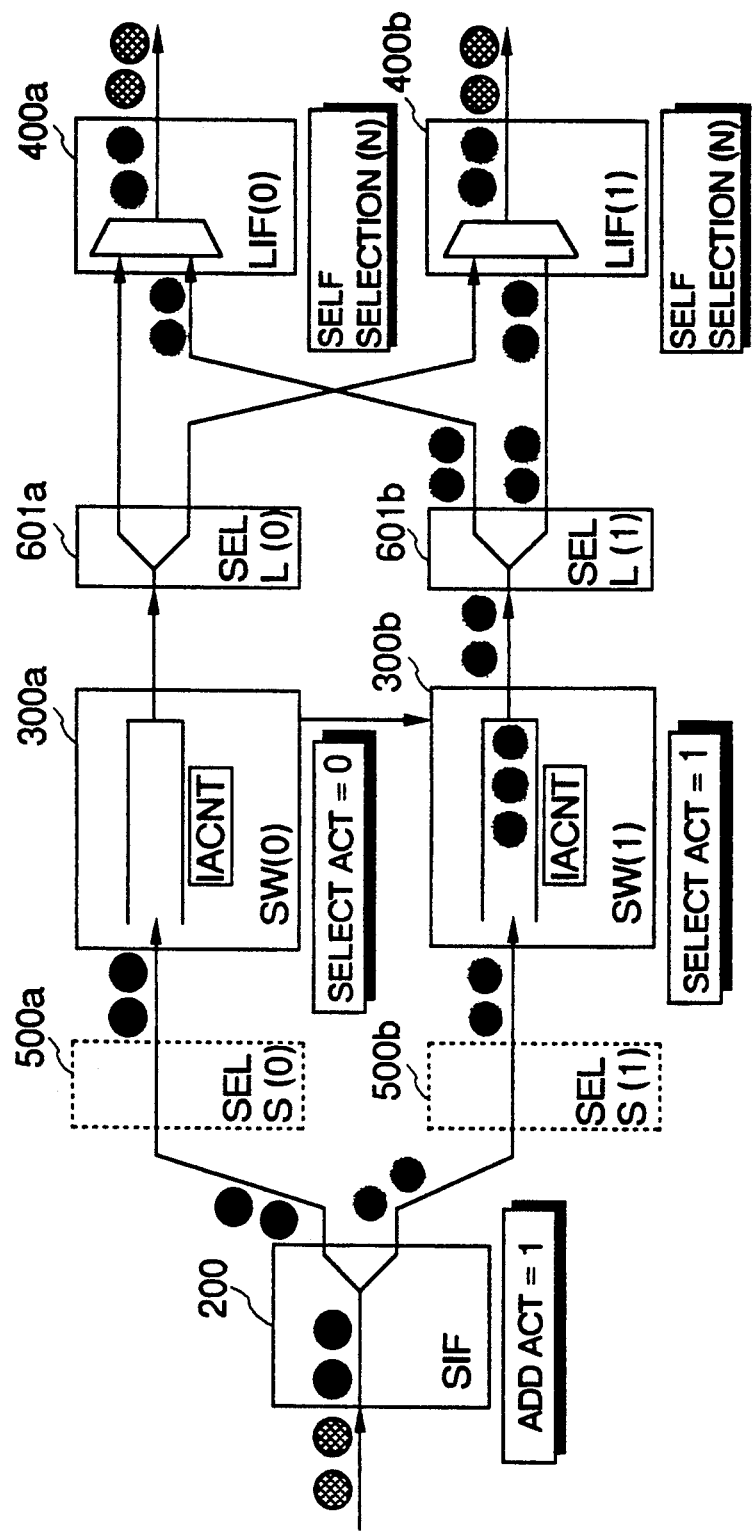

FIG. 20: Output prohibition for cell switching circuit of system 1 is canceled.

By the operation of the immediately preceding step, all of the cells of the system 0 have already been released. Even if cells are outputted from the cell switching circuit 300b of the system 1 in this state, the order is not inverted. In response to the detection signal fed from the IACNT 320a, therefore, the output prohibition state for the buffer of the cell switching circuit 300b is canceled, and cell output from it as started.

Figure 21:
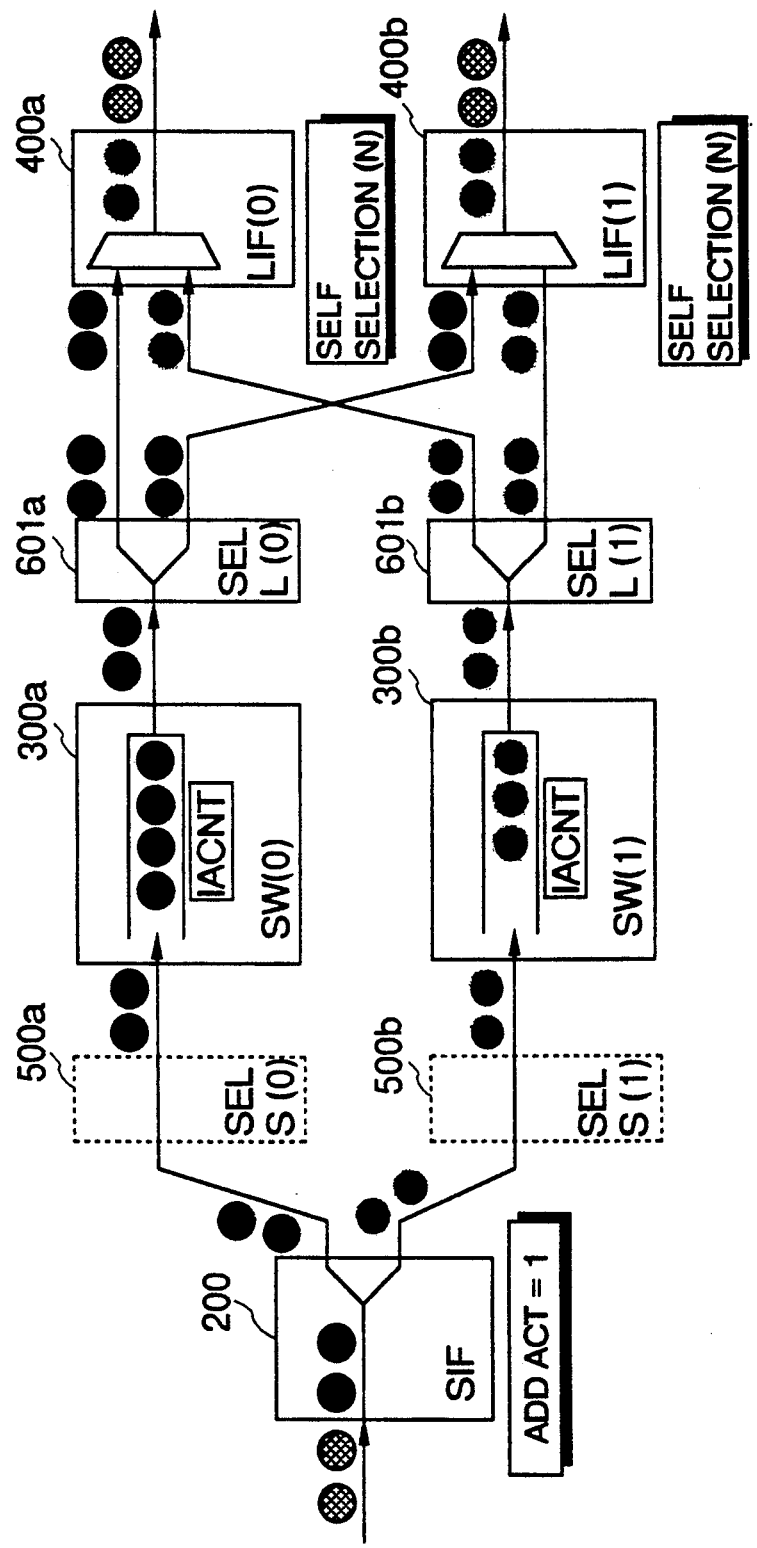

FIG. 21: Forced selection mode of cell switching circuits of systems 0 and 1 is canceled.

Since the cell transfer function has been switched to the standby system by the operation of FIG. 20, the normal state is restored.

By the operation heretofore described, switching of the cell transfer function to the standby system is completed. In order to confirm forced discard of the buffer in the cell switching circuit, the capacity of idle address buffer of the cell transfer function is monitored by the IACNT 320a and 320b. The quantity of idle address buffers which is the result of this monitoring is subtracted from all cell buffers. Thereby the quantity of buffers now in use can be derived. This can be employed mutually as the signal of output permission for the cell switching circuit of the other party.

SYSTEM SWITCHING WITHOUT LOSS OF SIGNAL IN DOWNSTREAM DIRECTION

FIGS. 22 to 31 show respective steps of cell switching operation in the downstream operation.

The configuration of the transmitted cell switching system of the upstream direction shown in FIGS. 22 to 31 and the outline of the operation of this switching system will now be described. Cells inputted from the office line side to the interface packages 400a and 400b of the office line side are selected by selector circuits 601a and 601b of the office line side and switched in the cell switching circuits 300a and 300b. Cells thus switched are sent to the subscriber interface package 200 via the selector circuits 500a and 500b of the subscriber line side and then transmitted to the subscriber line. The switching system of the downstream direction is provided independently of the switching system of the upstream direction and is controllable independently. Herein, 350a and 350b denote cell buffer memories, and 360a and 360b denote idle address counters. Since the configuration of each of interfaces of the input and output is apparent to those skilled in the art from that of the switching system of the upstream direction, its detailed description will be omitted.

Figure 22:
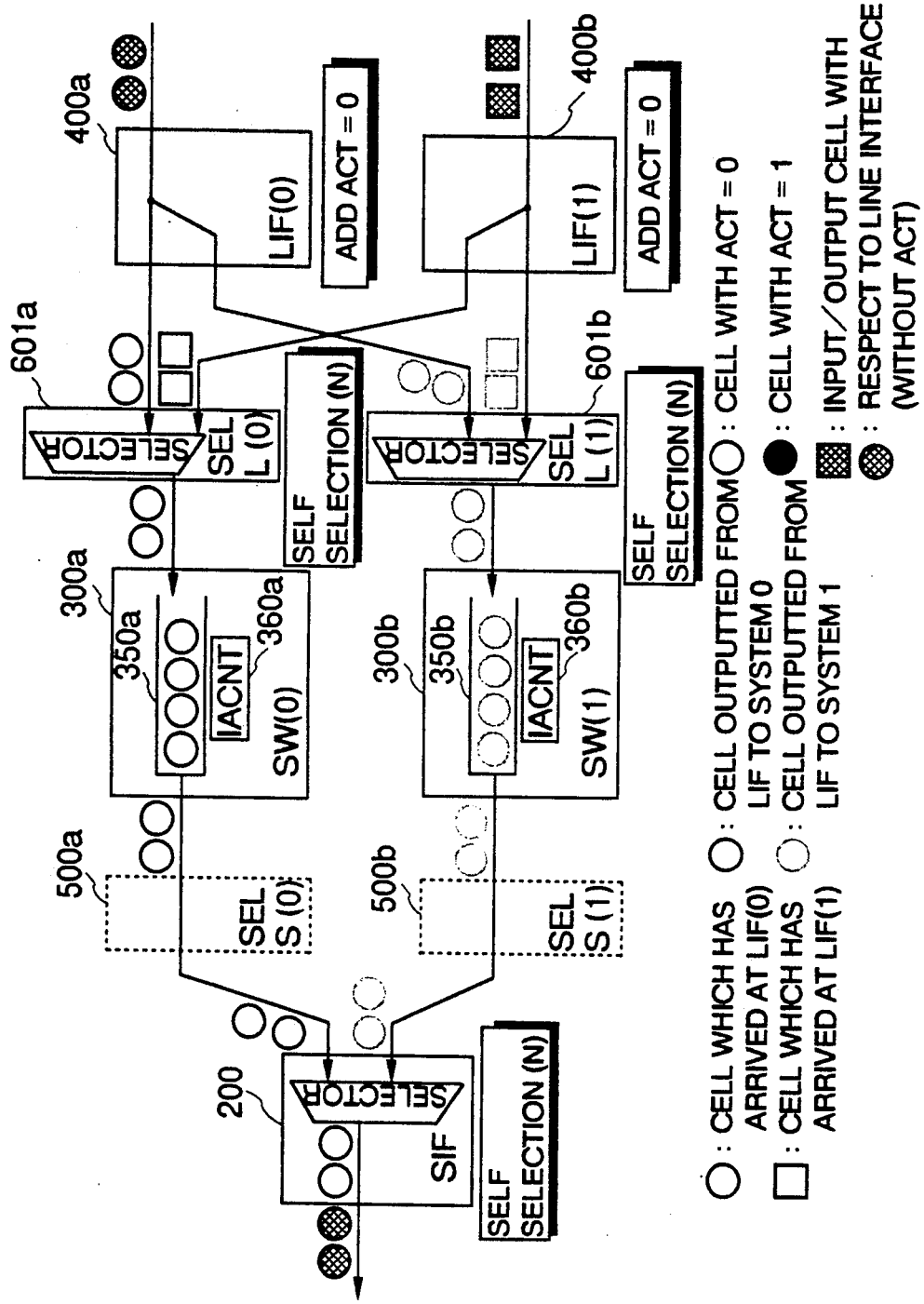

FIG. 22: The active state indicating that the cell switching circuit of the system 0 has received transfer selection is the initial state. Also, the system 0 serves as the primary system.

The system selection bit of cells is set at 0. Selectors disposed in the selector package 601a of the system 0 and the selector package 601b of the system 1 have self selection mode (N). In this mode, cells having system selection =0 are selected for input of system 0 and cells having system selection =1 are selected for input of the system 1. That is to say, the input from the interface package 400a of the system 0 is transferred in the cell switching circuit 300a of the system 0 in this mode.

Figure 23:
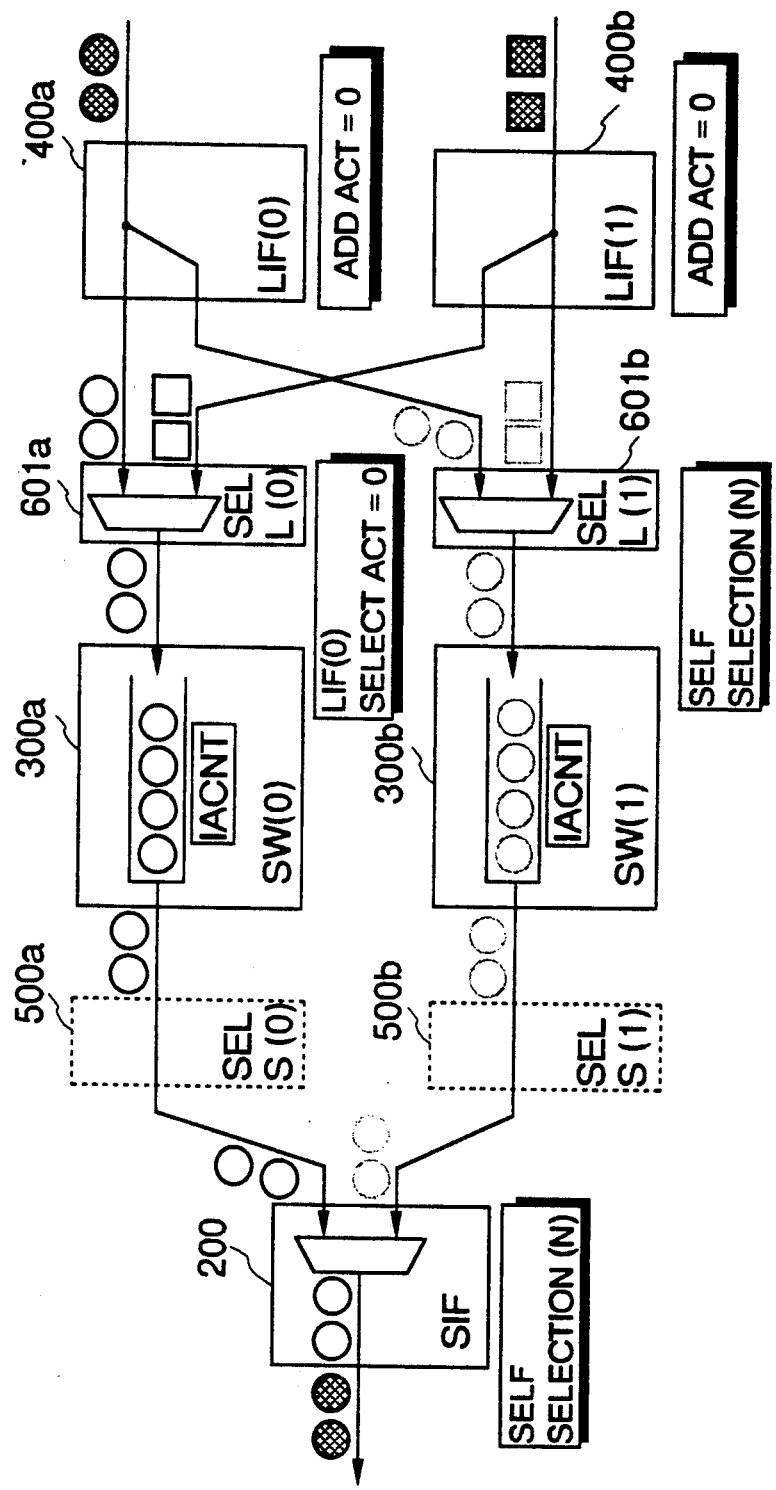

FIG. 23: Forced selection of cells of the system 0 of the interface package of system 0 is specified for the selector 500a of system 0

The selector 601a of the system 0 is so set as to select only cells of the system 0 which have reached from the interface package 400a of the system 0. That is to say, it is ordered to discard cells which have arrived from the interface package 400b and cells with the system selection bits being equivalent to 1. This aims at releasing all cells of the system 0 after the system switching and before cells of the system 1 are outputted by the cell switching circuit 300b of the system 1. If the system selection hit is changed over in a simple self selection mode, the input from the interface package 400b also becomes active. Therefore, interface package specification is performed. Any change in system operation is not caused by this manipulation.

Figure 24:
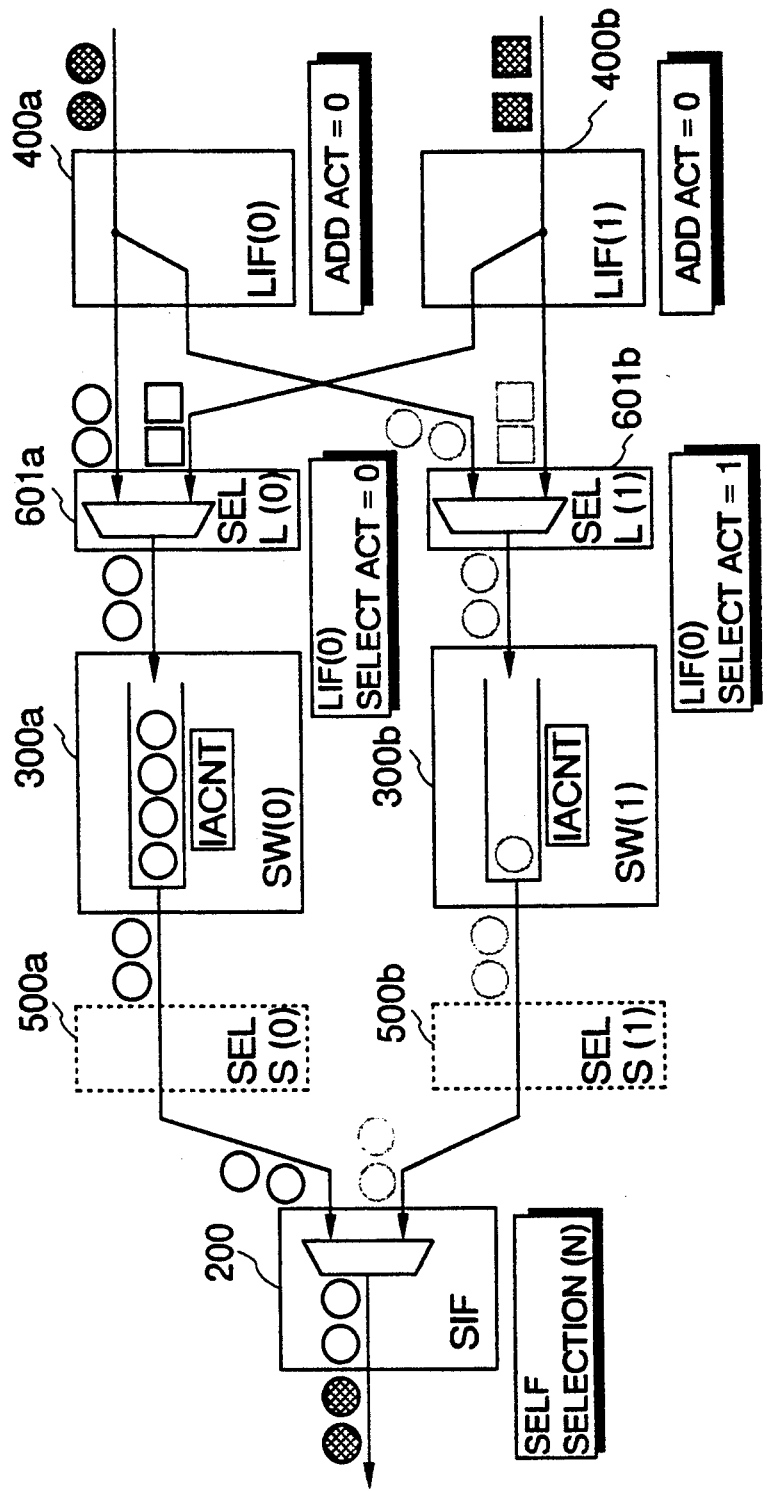

FIG. 24: Forced selection of cells of the system 1 of the interface package of system 0 is specified for the selector 500b of system 1.

The selector 601b of the system 1 is so set as to select only cells of the system 1 which have reached from the interface package 400a of the system 0. That is to say, it is ordered to discard cells which have arrived from the interface package 400b and cells with the system selection bits being equivalent to 0. Thereby, inputting of cells of the system 0 to the cell switching circuit 300b of the system 1 is stopped. In the cell switching circuit 300b of the system 1, therefore, cells of the system 0 are not inputted and the cells stored in the buffer decrease with a lapse of time in quantity. Interface package specification is conducted in the same way as FIG. 23.

Figure 25:
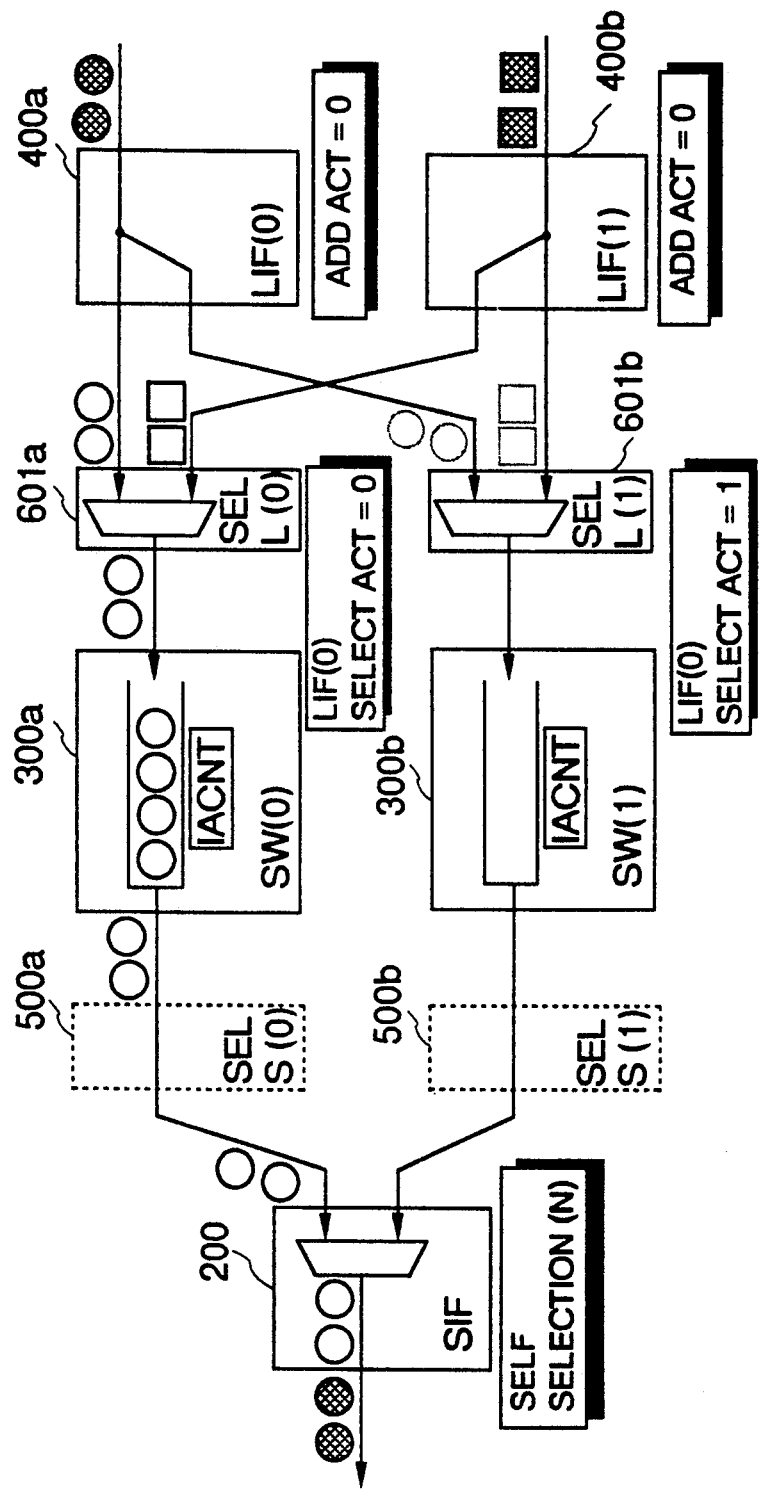

FIG. 25: Cell switching circuit of system 1 is forced to discard cells.

The state after cells stored in the cell switching circuit 300b of the system 1 have been forcibly discarded is shown.

Figure 26:
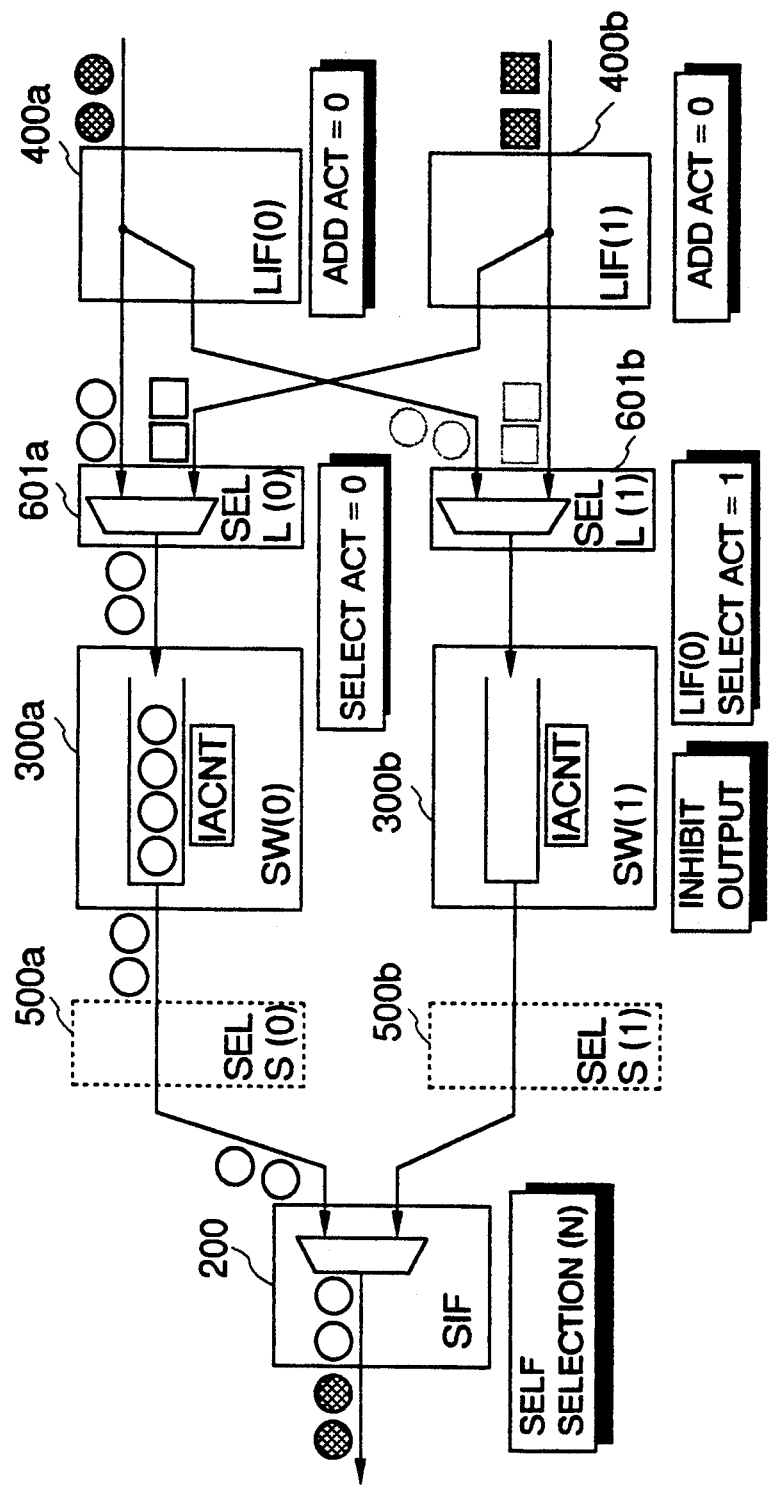

FIG. 26: Output prohibition for cell switching circuit of system 1 is set.

The cell switching circuit 300b of the system 1 is inhibited from outputting cells. This aims at preventing inversion o& cell order by inhibiting the cell switching circuit of the system 1 from outputting cells until all of the cells buffered in the cell switching circuit of the system 0 are released.

Figure 27:
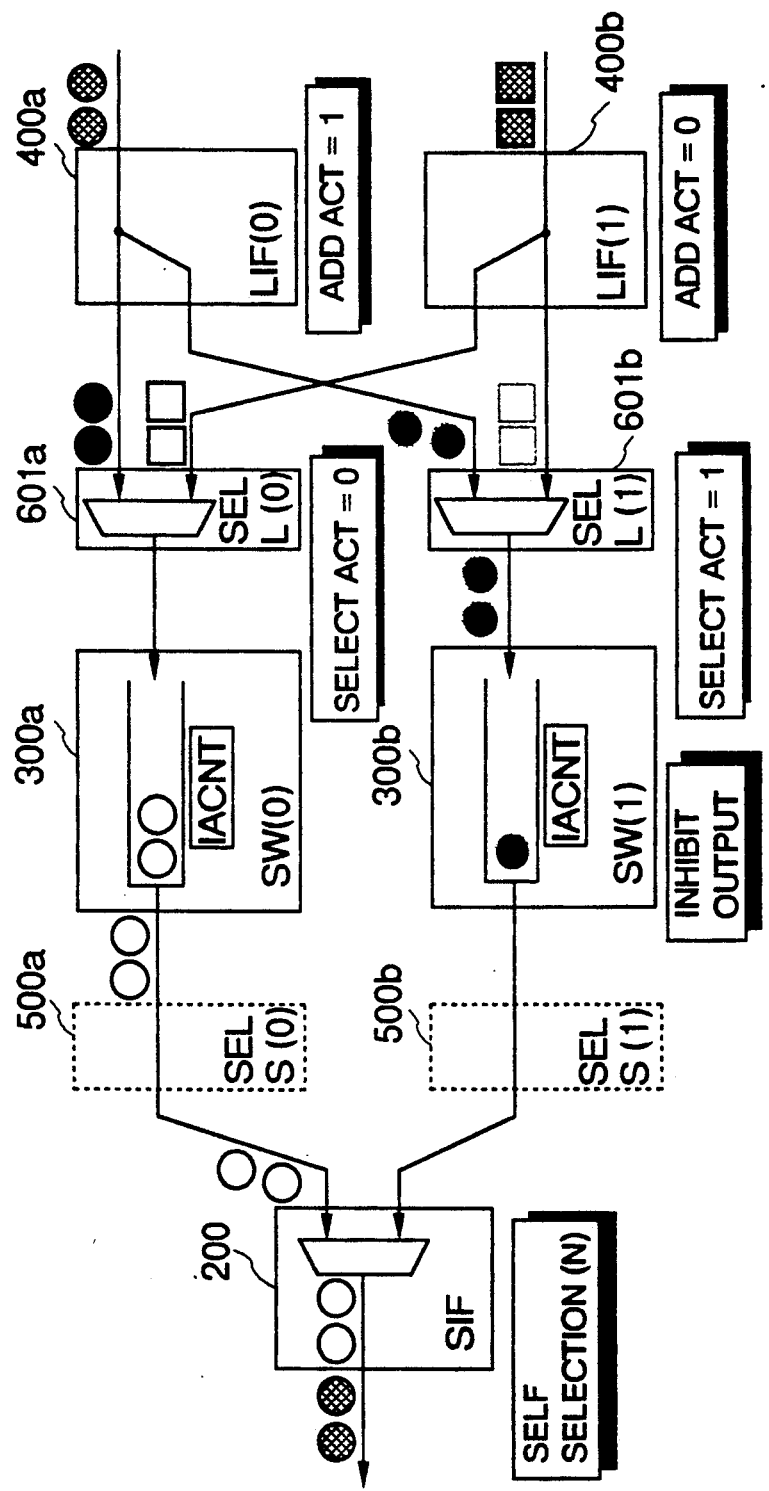

FIG. 27: Outputting cells of system 1 is specified for the interface package of the system 0

The interface package 400a of the system 0 is ordered to output succeeding cells to the system 1. To be concrete, system selection bits of succeeding cells are set at 1. Thereby succeeding cells are stored only in the cell switching circuit 300b of the system 1, and cells are not buffered in the cell switching circuit 300a of the system 0.

Figure 28:
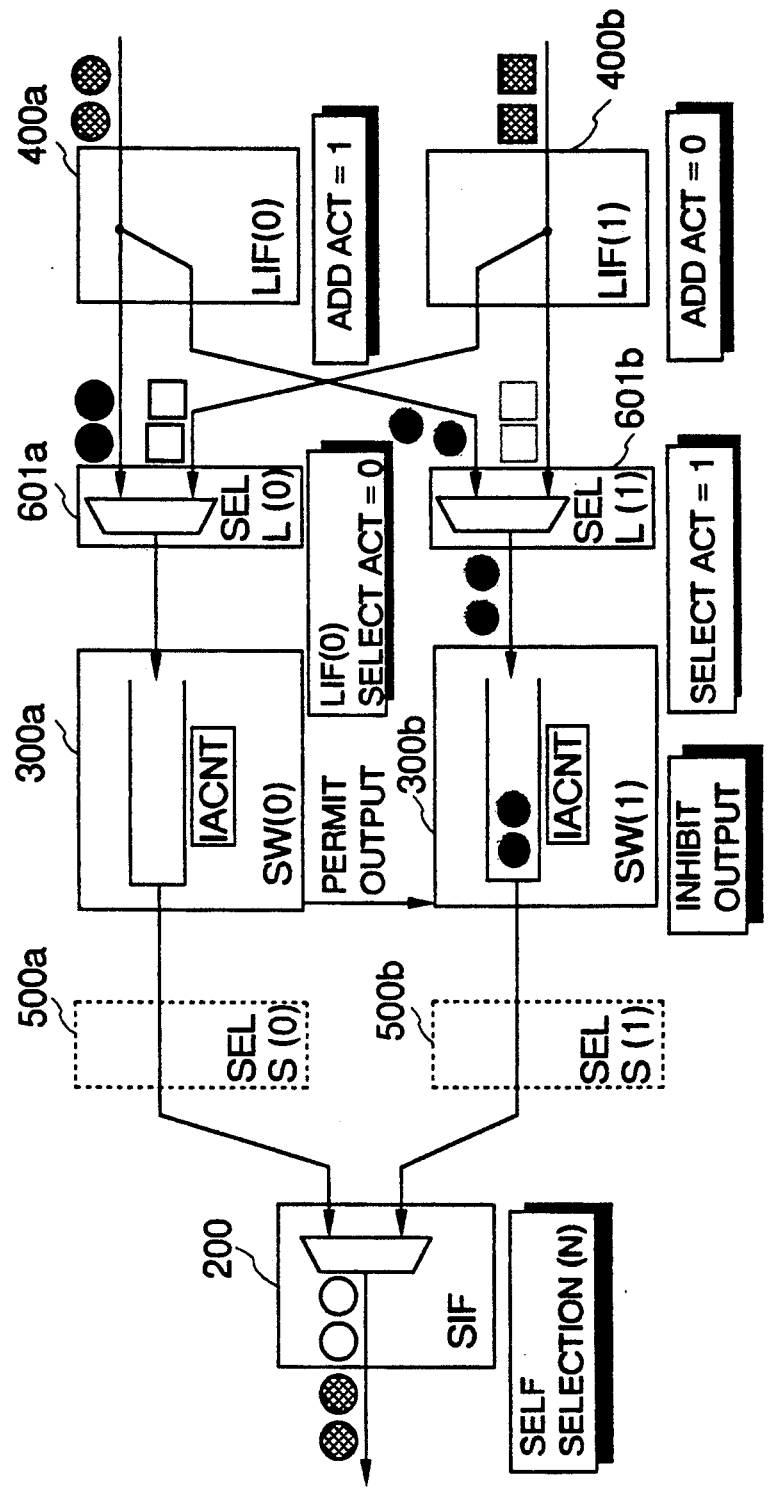

FIG. 28: Cells with system selection =1 are no longer stored in the cell switching circuit 300a of the system 0. Therefore, all stored cells of the system 0 are outputted to thereby render the buffer in the cell switching circuit of the system 0 to be empty.

Figure 29:
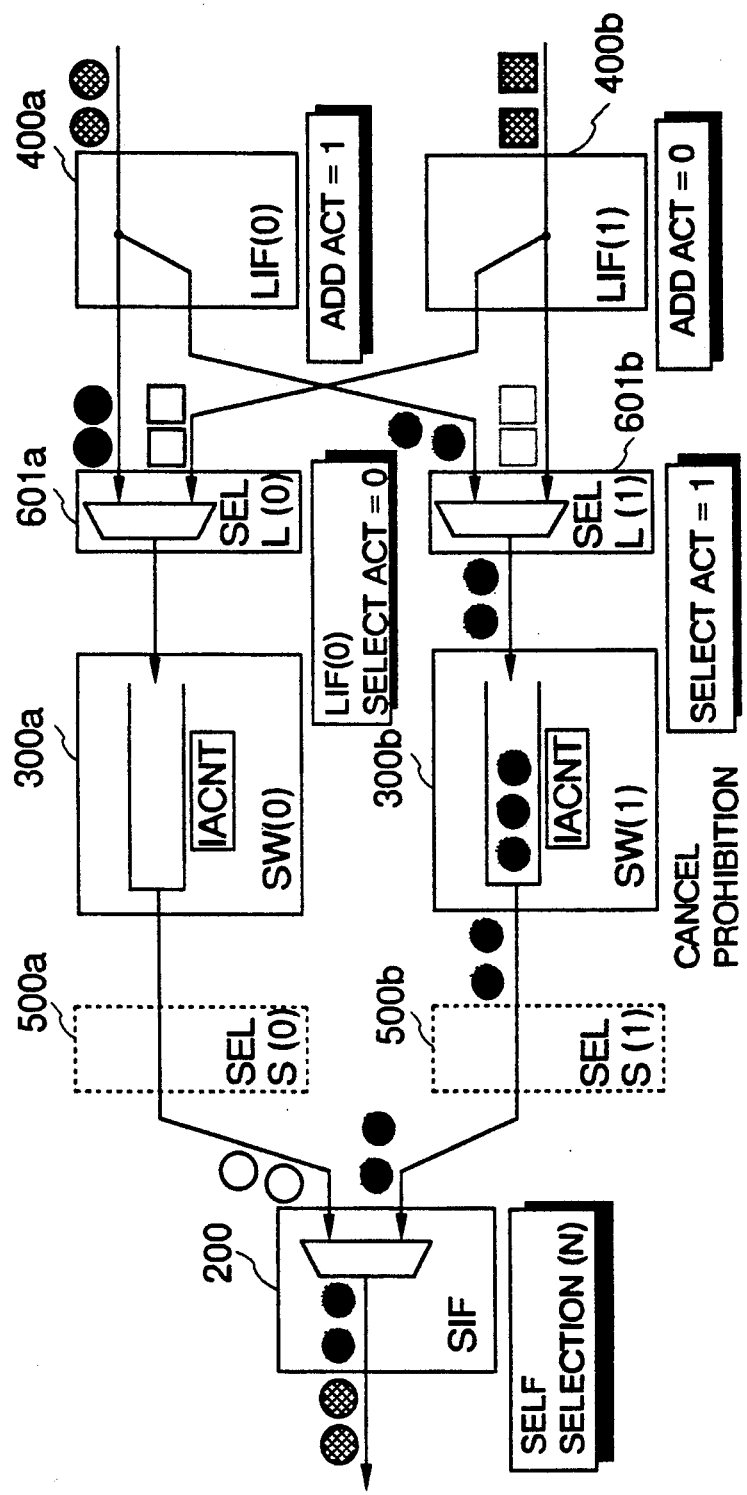

FIG. 29: Output prohibition for cell switching circuit of system 1 is canceled.

BY the operation of FIG. 28, all of the cells of the system 0 have already been released. Even if cells are outputted from the cell switching circuit of the system 1 in this state, the order is not inverted. Therefore, cell output from the cell switching circuit 300b of the system 1 is started.

Figure 30:
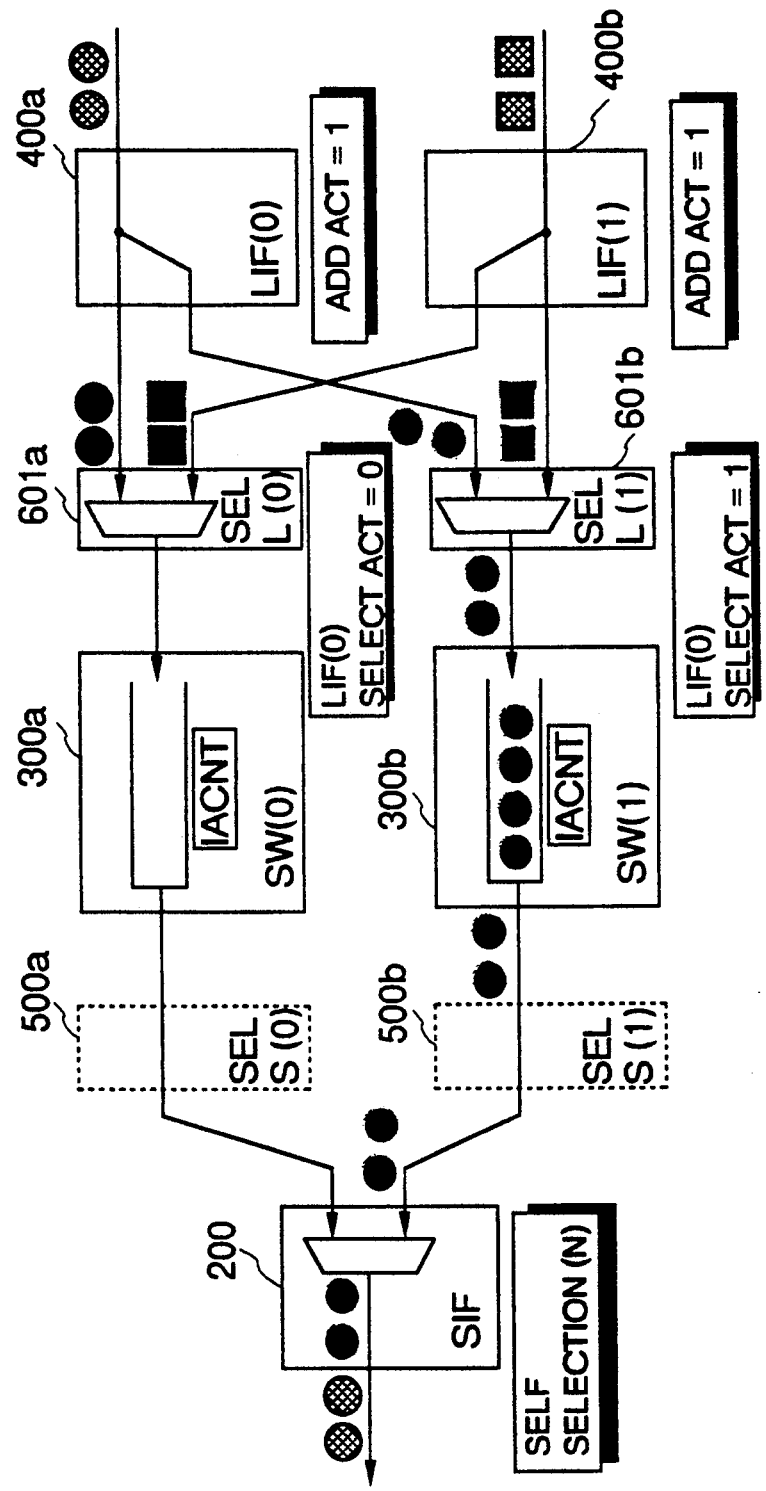

FIG. 30: Cell output of system 1 is specified for the interface package of system 1.

Since the cell transfer function has been switched to the standby system by the operation of FIG. 29, the system selection bit is so set that the system 1 may become the primary system in cells outputted from the interface package 400b as well.

Figure 31:
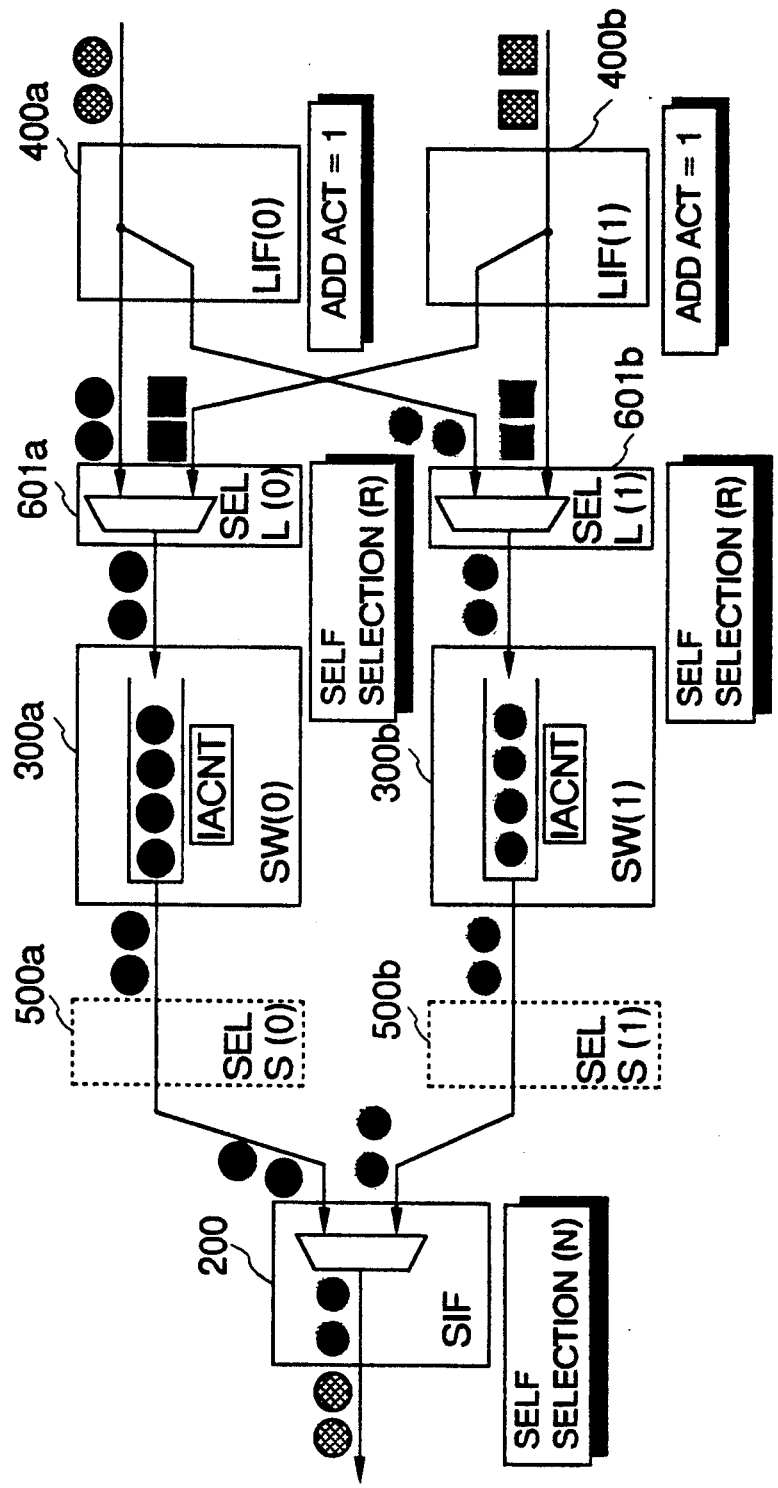

FIG. 31: Forced selection mode of the selectors 500a and 500b of the systems 0 and 1 is canceled.

BY the operation heretofore described, switching of the cell transfer function to the standby system is performed, and hence the normal-state is restored. That is to say, SEL L is set at self selection mode (1). In this mode, cells having system selection =0 are selected for input of system 0 and cells having system selection =1 are selected for input of the system 1. That is to say, the input from the interface package 400a of the system 0 is transferred in the cell switching circuit 300b of the system 1 :n this mode.

FIG. 32 shows a flow diagram comprising function steps 102-114 showing a collection of individual operations of system switching without loss of signal performed in the upstream direction of the subscriber exchange as shown in FIGS. 13 to 21.

FIG. 33 show a flow diagram comprising :unction steps 122-136 showing a collection of individual operations of system switching without loss of signal performed in the downstream direction of the subscriber exchange as shown in FIGS. 22 to 31.

The method of the present embodiment has an advantage that system switching without loss of signal and with the cell order maintained becomes possible even in the case where one of interfaces is not duplexed.

What is claimed is:

1. A system switching method for performing cell multiplexing or cell switching in a duplex system without loss of signal, said duplex system comprising a primary system and a standby system in a communication apparatus using an asynchronous transfer mode, said primary system and said standby system including cell switches each having a cell buffer, at least one receiving interface means provided interstage preceding a plurality of said cell switches, for receiving cells from a first transmission path, at least on transmitting interface means provided in the stage succeeding said plurality of said cell switches, for performing output control upon transferred cells from said cell switches and outputting cells to a second transmission path, said receiving interface means including adding means for adding control information for controlling the cell state of the cell buffer to conduct switching between the primary system and the standby system to the received cell, and each of said cell switches including monitoring means for monitoring the cell storage state of a cell buffer included in said cell switches and informing each of said cell switches of information of cell storage state to the cell buffer, and execution means for executing switching between the primary system and the standby system based on said control information and information of cell storage state, said system switching method comprising the steps of:

at a first point of time, inhibiting said cells of said primary system from being outputted and discarding contents of said cell buffer of said primary system;

at a second time point when the discarding of the contents of said cell buffer of said primary system is completed, inhibiting cells from being inputted to said standby system and inputting cells to only said primary system; and at a third time point when all contents of said cell buffer of said standby system are outputted, outputting the cells of said primary system.

2. A system switching method according to claim 1, wherein said step to inhibiting cells from being inputted to said standby system and inputting cells to only said primary system comprises a step of adding information indicating whether input to the pertinent system is active or void to cells inputted to said communication apparatus.

3. A system switching method according to claim 1, wherein said step of inhibiting said cells of said primary system from being outputted and discarding contents of said cell buffer of said primary system comprises a step to adding information indicating whether the output in that system is void or active to cells inputted to said communication apparatus.

4. A system switching method according to claim 1, further comprising steps of:
identifying that all of the contents to the cell buffer of said standby system have been outputted; and
at the time of cell input, adding information indicating completion of outputting of all contents to a cell lastly inputted of said standby system to identity that all of the contents of said cell buffer of said standby system have been outputted.

5. A system switching method according to claim 1, further comprising the steps of:
identifying that all of the contents of the cell buffer of said standby system have been outputted; and
counting idle regions of the cell buffer storing said cells in said standby system to identity that al of the contents of said cell buffer of said standby system have been outputted.

6. A system switching method according to claim 1, further comprising a stp of, at the time of cell input to said communication apparatus, adding information for instructing the contents of said cell buffer of said primary system to be discarded to said inputted cell.

7. A system switching method for performing cell multiplexing or cell switching in a duplex system without loss of signal, said duplex system comprising a primary system and a standby system in a communication apparatus using an asynchronous transfer mode, said primary system and said standby system including cell switches each having a cell buffer, at least one receiving interface means provided in the stage preceding a plurality of said cell switches, for receiving cells from a first transmission path, at least one transmitting interface means provided in the stage succeeding said plurality of said cell switches, for performing output control upon transferred cells from said cell switches and outputting cells to a second transmission path, said receiving interface means including adding means for adding control information for controlling the cell state of the cell buffer to conduct switching between the primary system and the standby system to the receiving cell, and each of said cell switches including monitoring means for monitoring the cell storage state of a cell buffer included in said cell switches and informing each of said cell switches of information of cell storage stat of the cell buffer, and execution means for executing switching between the primary system and the standby system based on said control information and information of cell storage state, said system switching method comprising the steps of:

preparing control information for performing switching between said primary system and said standby system;
when a cell is inputted to said communication apparatus, adding said prepared control information to said cell; and
transmitting the cell with control information added thereto to the duplex system comprising the primary system and the standby system, and controlling cell transfer of respective systems on the basis of said control information.

8. A system switching method according to claim 7, wherein said control information to he added to cells comprises selection information for cell outputs from said primary system and said standby system, and said system switching method further comprises a step of selecting cells to be outputted from the communication apparatus out of transferred cells from said primary system and said standby system on the basis of said selection information.

9. A system switching method according to claim 8, wherein said transferred cell selecting step comprises a step of overriding said control information added to cells and supplying predetermined selection information.

10. A system switching method according to claim 7, further comprising a step o: selecting a cell out of cells transferred from respective systems, then removing said added control information from said cell, and outputting said cell from the duplex system.

11. A system switching apparatus for performing cell multiplexing or cell switching in a duplex system without loss of signal, said duplex system comprising a primary system and a standby system in communication apparatus using an asynchronous transfer mode, said system switching apparatus comprising: said primary system and said standby system comprising cell switches each having a cell buffer;
at least one receiving interface mans provided in the stage preceding a plurality of said cell switches, for receiving cells from a first transmission path;
at least one transmitting interface means provided in the stage succeeding said plurality of said cell switches, for performing output control upon transferred cells from said cell switches and outputting a cell to a second transmission path;
said receiving interface and comprising adding means for adding control information for controlling the cell state of the cell buffer to conduct switching between said primary system and said standby system to said received cell; and
each of said cell switches comprising monitoring means for monitoring the cell storage state of a cell buffer included in said cell switch and informing each of said cell switches of information of cell storage state of the cell buffer, and execution means for executing switching between said primary system and said standby system based on said control information and information of cell storage state.

12. A system switching apparatus according to claim 11, wherein said monitoring means comprises a monitor circuit, responsive to control information so added by said control information adding means to include information indicating the last cell to be switched, to identify that all contents of the pertinent cell switch have been sent out, sand said monitor circuit is positioned on the output side of the cell buffer.

13. A system switching apparatus according to claim 12, wherein said monitoring means comprises a counter for counting idle regions of the buffer of the cell switch of the system.

14. In a communication system of an asynchronous mode, a method of performing cell multiplexing or cell switching in a duplex system of the communication system including a primary system and a standby system without loss of signal, said primary system and said standby system including cell switches each having a cell buffer, at least one receiving interface means provided in the stage preceding a plurality of said cell switches, for receiving cells from a first transmission path, at least on transmitting interface means provided in the stage succeeding said plurality of said cell switches, for performing output control upon transferred cells from said cell switches and outputting cells to a second transmission path, said receiving interface means including adding means for adding control information for controlling the cell state of the cell buffer to conduct switching between the primary system and the standby system to the received cell, and each of said cell switches including monitoring means for monitoring the cell storage state of a cell buffer included in said cell switches and informing each of said cell switches of information of cell storage state to the cell buffer, and execution means for executing switching between the primary system and the standby system based on said control information and information of cell storage state, said system switching method comprising the steps of:

inhibiting inputting of cells to said primary system of said duplex system at a first point of time;

at a second point to time when outputting of cells buffered in said primary system is completed after said first point of time, inhibiting inputting of cells to said standby system of said duplex system and outputting of cells from said primary system, and permitting cells to be inputted to said primary system; and at a third point of time when outputting of all contents of said said cell buffer said standby system is completed, outputting cells buffered in said primary system.

* * * * *